(12) United States Patent
Kojima et al.

(10) Patent No.: US 12,134,375 B2
(45) Date of Patent: Nov. 5, 2024

(54) ELECTRIC BRAKE DEVICE AND ELECTRIC BRAKE CONTROL DEVICE

(71) Applicant: Hitachi Astemo, Ltd., Hitachinaka (JP)

(72) Inventors: Daisuke Kojima, Hitachinaka (JP); Norikazu Matsuzaki, Hitachinaka (JP); Masayuki Kikawa, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 127 days.

(21) Appl. No.: 17/911,295

(22) PCT Filed: Mar. 24, 2021

(86) PCT No.: PCT/JP2021/012206
§ 371 (c)(1),
(2) Date: Sep. 13, 2022

(87) PCT Pub. No.: WO2021/200459
PCT Pub. Date: Oct. 7, 2021

(65) Prior Publication Data
US 2023/0126047 A1      Apr. 27, 2023

(30) Foreign Application Priority Data
Mar. 31, 2020      (JP) ................ 2020-062317

(51) Int. Cl.
*B60T 13/74* (2006.01)
*H02P 29/00* (2016.01)
*H02P 29/60* (2016.01)

(52) U.S. Cl.
CPC .......... *B60T 13/74* (2013.01); *H02P 29/0022* (2013.01); *H02P 29/60* (2016.02)

(58) Field of Classification Search
CPC ...... B60T 13/74; H02P 29/60; H02P 29/0022; H02P 29/0016; H02P 29/00
(Continued)

(56) References Cited

U.S. PATENT DOCUMENTS 9,701,290 B2 * 7/2017 Baehrle-Miller ....... B60T 8/171
2011/0278108 A1   11/2011 Watanabe et al.
(Continued)

FOREIGN PATENT DOCUMENTS

JP    2013-209041    10/2013
JP    5333114        11/2013
(Continued)

OTHER PUBLICATIONS

International Search Report issued May 25, 2021 in International Application No. PCT/JP2021/012206, with English translation.
(Continued)

*Primary Examiner* — Kawing Chan
(74) *Attorney, Agent, or Firm* — Wenderoth, Lind & Ponack, L.L.P.

(57) ABSTRACT

A parking brake control device is configured to, when releasing a hold on a braking force, energize an electric motor, and change a drive time of the electric motor based on a current change amount in a predetermined interval after a predetermined time has elapsed since a current value of the electric motor starts to decrease after increasing and a current value at which the current change amount of the electric motor converges to a predetermined value or less.

9 Claims, 13 Drawing Sheets

(58) Field of Classification Search
USPC .......................................................... 318/473
See application file for complete search history.

(56) References Cited

U.S. PATENT DOCUMENTS

| | | | |
|---|---|---|---|
| 2013/0261917 A1 | 10/2013 | Kotake et al. | |
| 2015/0226776 A1* | 8/2015 | Nishikubo | H02P 21/13 |
| | | | 702/65 |
| 2016/0176388 A1* | 6/2016 | Baehrle-Miller | B60T 8/171 |
| | | | 701/70 |
| 2020/0343842 A1* | 10/2020 | Breynaert | H02P 7/0094 |

FOREIGN PATENT DOCUMENTS

| | | | | |
|---|---|---|---|---|
| JP | 6017162 | | 10/2016 | |
| JP | 6205821 | | 10/2017 | |
| JP | 6205821 B2 * | 10/2017 | | B60T 13/74 |

OTHER PUBLICATIONS

Written Opinion of the International Searching Authority issued May 25, 2021 in International Application No. PCT/JP2021/012206, with English translation.

* cited by examiner

ELECTRIC BRAKE DEVICE AND ELECTRIC BRAKE CONTROL DEVICE

CROSS-REFERENCE TO RELATED APPLICATION

The present application claims priority based on Japanese Patent Application No. 2020-062317 filed on Mar. 31, 2020. All disclosed contents including the Specification, the Scope of the Claims, the Drawings, and the Abstract of Japanese Patent Application No. 2020-062317 are incorporated herein by reference in their entirety.

TECHNICAL FIELD

This disclosure relates to an electric brake device and an electric brake control device which apply a braking force to a vehicle, for example, an automobile.

BACKGROUND ART

As a brake device arranged in a vehicle such as an automobile, there has been known an electric brake device which presses a braking member (for example, a brake pad) against a braked member (for example, a disc rotor) by a drive (rotation) of a motor (electric motor) when the vehicle is stopped or parked, for example, and holds a braking force. A disc brake device of Patent Literature 1 detects, when the hold on the braking force is released, that the braking force has been released based on a derivative value of a motor current, and stops the drive of the electric motor under a state in which a clearance between the brake pads and the disc rotors is secured based on the subsequent motor rotation amount.

CITATION LIST

Patent Literature

PTL 1: JP 2013-209041 A (JP 6017162 B2)

SUMMARY OF INVENTION

Technical Problem

In the case of the technology as disclosed in Patent Literature 1, the clearance between the braking member and the braked member may vary when the hold of the braking force is released.

It is an object of one embodiment of the present invention to provide an electric brake device and an electric brake control device which are capable of accurately securing a clearance between a braking member and a braked member when a hold on a braking force is released.

Solution to Problem

According to one embodiment of the present invention, there is provided an electric brake device including: a motor configured to drive an electric mechanism configured to hold a braking force by pressing a braking member against a braked member; and a control device configured to control a drive of the motor, wherein the control device is configured to, when releasing the hold on the braking force, energize the motor, and change a drive time of the motor in accordance with a current change amount in a predetermined interval after a predetermined time has elapsed since a current value of the motor starts to decrease after increasing and a current value at which the current change amount of the motor converges to a predetermined value or less.

Further, according to one embodiment of the present invention, there is provided an electric brake device including: a motor configured to drive an electric mechanism configured to hold a braking force by pressing a braking member against a braked member; and a control device configured to control a drive of the motor, wherein the control device is configured to, when releasing the hold on the braking force, energize the motor, and change a drive time of the motor based on a current value acquired each predetermined cycle after the current value of the motor increases and then decreases to enter a predetermined current value range and a current value at which the current value becomes substantially constant.

Further, according to one embodiment of the present invention, there is provided an electric brake control device for controlling a motor configured to drive an electric mechanism configured to hold a braking force by pressing a braking member against a braked member, the electric brake control device being configured to, when releasing the hold on the braking force, energize the motor, and change a drive time of the motor in accordance with a current change amount in a predetermined interval after a predetermined time has elapsed since a current value of the motor starts to decrease after increasing and a current value at which the current change amount of the motor converges to a predetermined value or less.

According to the one embodiment of the present invention, a clearance between the braking member and the braked member can be accurately secured when the hold on the braking force is released.

DESCRIPTION OF EMBODIMENTS

There is now described with reference to the accompanying drawings an example of a case in which an electric brake device and an electric brake control device according to an embodiment of the present invention are mounted on a four-wheeled automobile. In the flowcharts illustrated in FIG. 4 to FIG. 7, each step is indicated by using the notation "S" (for example, Step 1="S1").

Figure 1:
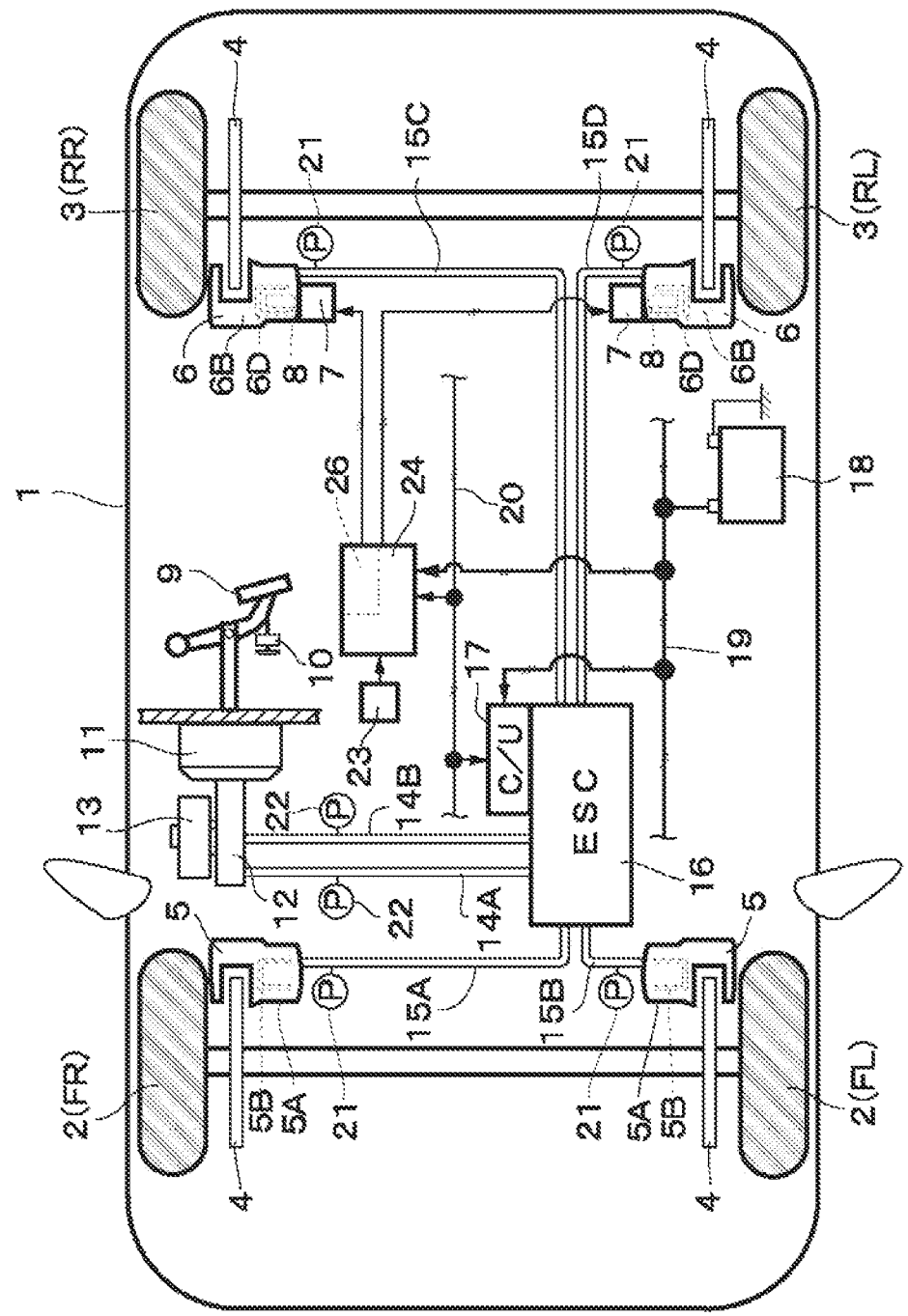
FIG. 1 is a conceptual diagram of a vehicle having mounted thereon an electric brake device and an electric brake control device according to an embodiment of the present invention.

FIG. 1 to FIG. 13 are diagrams for illustrating the embodiment of the present invention. In FIG. 1, a total of four wheels including, for example, left and right front wheels 2 (FL, FR) and left and right rear wheels 3 (RL, RR) are arranged on a lower side (road surface side) of a vehicle body 1 forming a body of the vehicle. The wheels (each of the front wheels 2 and rear wheels 3) form the vehicle together with the vehicle body 1. The vehicle is equipped with a braking system for applying a braking force. The vehicle braking system is now described.

A disc rotor 4 is arranged on each of the front wheels 2 and the rear wheels 3 as a braked member (rotating member) which rotates together with each wheel (each front wheel 2 and each rear wheel 3). A braking force is applied to the disc rotor 4 for each front wheel 2 by a front-wheel disc brake 5, which is a hydraulic disc brake. A braking force is applied to the disc rotor 4 for each rear wheel 3 by a rear-wheel disc brake 6, which is a hydraulic disc brake having an electric parking brake function.

Figure 2:
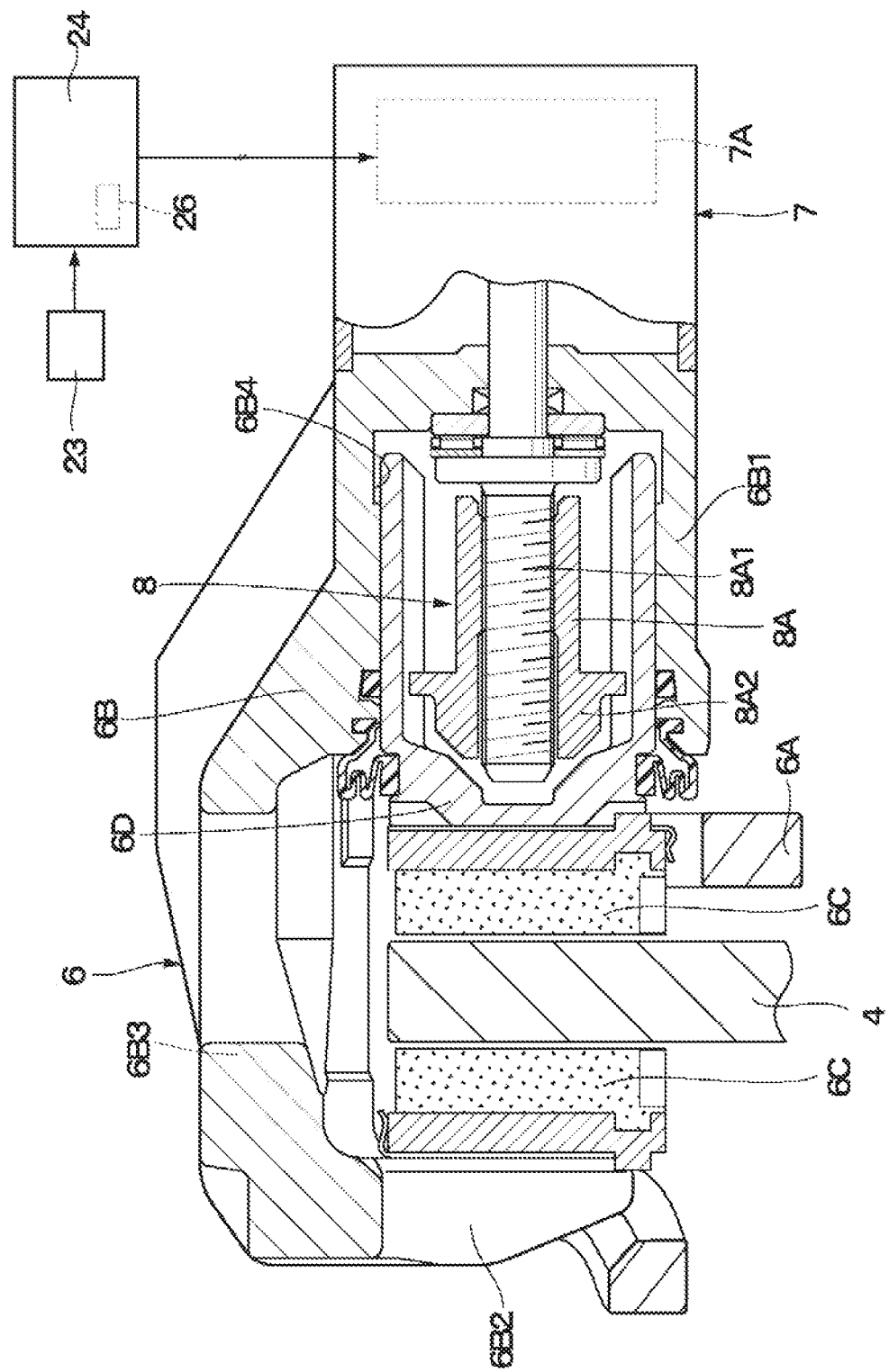
FIG. 2 is an enlarged vertical cross-sectional view of a disc brake having an electric parking brake function, which is arranged on a rear wheel side of FIG. 1.

The pair (set) of the rear-wheel disc brakes 6 arranged corresponding to the left and right rear wheels 3 is a hydraulic pressure type brake mechanism (hydraulic brake) which applies a braking force by pressing brake pads 6C (see FIG. 2) against the disc rotor 4 by hydraulic pressure. As illustrated in FIG. 2, the rear-wheel disc brakes 6 include, for example, a mounting member 6A called a carrier, a caliper 6B serving as a wheel cylinder, a pair of brake pads 6C serving as a braking member (friction member, friction pad), and a piston 6D serving as a pressing member. In this case, the caliper 6B and the piston 6D form a cylinder mechanism, that is, a cylinder mechanism in which the piston 6D is moved by hydraulic pressure to press the brake pads 6C against the disc rotor 4.

The mounting member 6A is fixed to anon-rotating portion of the vehicle and is arranged so as to straddle an outer peripheral side of the disc rotor 4. The caliper 6B is arranged on the mounting member 6A such that the disc rotor 4 can move in an axial direction. The caliper 6B includes a cylinder main body portion 6B1, a claw portion 6B2, and a bridge portion 6B3 connecting the cylinder main body portion 6B1 and the claw portion 6B2. A cylinder (cylinder hole) 6B4 is arranged in the cylinder body 6B1, and the piston 6D is inserted in the cylinder 6B4. The brake pads 6C are movably mounted on the mounting member 6A and are arranged so as to be in contact with the disc rotor 4. The piston 6D presses the brake pads 6C against the disc rotor 4.

The caliper 6B propels the brake pads 6C by the piston 6D by supplying (adding) hydraulic pressure (brake hydraulic pressure) into the cylinder 6B4 based on an operation of a brake pedal 9, for example. At this time, the brake pads 6C are pressed on both sides of the disc rotor 4 by the claw portion 6B2 of the caliper 6B and the piston 6D. As a result, a braking force is applied to the rear wheel 3 rotating together with the disc rotor 4.

The rear-wheel disc brakes 6 further include an electric actuator 7 and a rotation-linear motion conversion mechanism 8. The electric actuator 7 includes an electric motor 7A serving as a motor and a speed reducer (not shown) which decelerates the rotation of the electric motor 7A. The electric motor 7A serves as a propulsion source (drive source) for propelling the piston 6D. The rotation-linear motion conversion mechanism 8 forms a holding mechanism (pressing member holding mechanism) which holds the pressing force of the brake pads 6C.

In this case, the rotation-linear motion conversion mechanism 8 includes a rotation-linear motion member 8A which converts the rotation of the electric motor 7A into an axial-direction displacement (linear displacement) of the piston 6D and propels the piston 6D. The rotation-linear motion member 8A is constructed from, for example, a screw member 8A1 made of a rod-shaped body on which a male screw is formed and a linear motion member 8A2 which serves as a propulsion member having a female screw hole formed on an inner peripheral side. The rotation-linear motion conversion mechanism 8 converts the rotation of the electric motor 7A into an axial-direction displacement of the piston 6D and holds the piston 6D propelled by the electric motor 7A. That is, the rotation-linear motion conversion mechanism 8 applies thrust to the piston 6D by the electric motor 7A, propels the brake pads 6C by the piston 6D to press the brake pads 6C against the disc rotor 4, and holds the thrust of the piston 6D.

The rotation-linear motion conversion mechanism 8 forms, together with the electric motor 7A, an electric mechanism of the electric brake device (electric parking brake device). The electric mechanism converts the rotational force of the electric motor 7A into thrust via the speed reducer and the rotation-linear motion conversion mechanism 8, and propels (displaces) the piston 6D to press the brake pads 6C against the disc rotors 4 and hold the braking force of the vehicle. The electric motor 7A drives the electric mechanism. Such an electric mechanism (that is, the electric motor 7A and the rotation-linear motion conversion mechanism 8) forms the electric brake device together with a parking brake control device 24 described later.

The rear-wheel disc brakes 6 propel the piston 6D by the brake hydraulic pressure generated based on an operation of the brake pedal 9, for example, to thereby apply a braking force to the wheels (rear wheels 3), and thus to the vehicle, by pressing the disc rotor 4 with the brake pads 6C. In addition to this, as described later, the rear-wheel disc brakes 6 apply a braking force (parking brake or auxiliary brake during traveling as required) to the vehicle by causing the electric motor 7A to propel the piston 6D via the rotation-linear motion conversion mechanism 8 in response to an operation request based on, for example, a signal from a parking brake switch 23.

That is, the rear-wheel disc brakes 6 drive the electric motor 7A, and press and hold the brake pads 6C against the disc rotor 4 by propelling the piston 6D by the rotation-linear motion member 8A. In this case, the rear-wheel disc brakes 6 hold the braking of the vehicle by propelling the piston 6D by the electric motor 7A in response to a parking brake request signal (application request signal), which is an application request for applying the parking brake. In addition to this, the rear-wheel disc brakes 6 brake the vehicle by supplying hydraulic pressure from a hydraulic pressure source (master cylinder 12, which is described later, and a hydraulic pressure supply device 16 as required) in response to an operation of the brake pedal 9.

As described above, the rear-wheel disc brakes 6 include the rotation-linear motion conversion mechanism 8 which presses the brake pads 6C against the disc rotor 4 by the electric motor 7A and holds the pressing force of the brake pads 6C, and can press the brake pads 6C against the disc rotor 4 by hydraulic pressure added separately from pressure applied by the electric motor 7A.

Meanwhile, the pair (set) of the front wheel side disc brakes 5 arranged corresponding to the left and right front wheels 2 are configured in substantially the same manner as the rear-wheel disc brakes 6 except for the mechanism relating to the operation of the parking brake. That is, as illustrated in FIG. 1, the front-wheel disc brakes 5 include, for example, a mounting member (not shown), a caliper 5A, brake pads (not shown), and a piston 5B, but do not include, for example, the electric actuator 7 (electric motor 7A) and the rotation-linear motion conversion mechanism 8 for operating and releasing the parking brake. However, the front-wheel disc brakes 5 are the same as the rear-wheel disc brakes 6 in terms of the point that the front-wheel disc brakes 5 propel the piston 5B by hydraulic pressure generated based on an operation of the brake pedal 9, for example, to thereby apply a braking force to the wheels (front wheels 2), and thus to the vehicle. That is, the front wheel side disc brakes 5 are a hydraulic brake mechanism (hydraulic brake) which applies a braking force by pressing the brake pads against the disc rotor 4 by hydraulic pressure.

The front-wheel disc brakes 5 may be, similarly to the rear-wheel disc brakes 6, a disc brake having an electric parking brake function. Further, in the embodiment, the hydraulic disc brakes 6 including the electric motor 7A are used as the electric brake mechanism (electric parking brake). However, the electric brake mechanism is not limited to this, and for example, electric drum brakes which apply a braking force by pressing a shoe against a drum by an electric motor, disc brakes including an electric drum type parking brake, and a cable puller type electric parking brake which operates by applying a parking brake by pulling a cable by an electric motor may also be used. That is, as the electric brake mechanism, various types of electric brake mechanisms can be used as long as the electric brake mechanism can press (propel) a friction member (pad, shoe) against a rotating member (rotor, drum) based on the drive of an electric motor (electric actuator), and hold and release the pressing force.

The brake pedal 9 is arranged on a front board side of the vehicle body 1. The brake pedal 9 is operated by the driver stepping on the pedal during a braking operation of the vehicle. A braking force is applied to or released from each of the disc brakes 5 and 6 as a regular brake (service brake) based on the operation of the brake pedal 9. The brake pedal 9 includes a brake lamp switch, a pedal switch (brake switch), and a brake operation detection sensor (brake sensor) 10 such as a pedal stroke sensor.

The brake operation detection sensor 10 detects presence or absence of an operation of stepping on the brake pedal 9 and the amount of that operation, and outputs a corresponding detection signal to an ESC control device 17. The detection signal of the brake operation detection sensor 10 is transmitted (is output to parking brake control device 24) via a vehicle data bus 20 or a communication line (not shown) connecting the ESC control device 17 and the parking brake control device 24, for example.

The operation of stepping on the brake pedal 9 is transmitted to the master cylinder 12 which functions as a hydraulic source (hydraulic pressure source) via a booster 11. The booster 11 is configured as a negative pressure booster (atmospheric pressure booster) or an electric booster arranged between the brake pedal 9 and the master cylinder 12. The booster 11 boosts the stepping force and transmits the boosted stepping force to the master cylinder 12 when the brake pedal 9 is operated. At this time, the master cylinder 12 generates hydraulic pressure by using brake fluid supplied (replenished) from a master reservoir 13. The master reservoir 13 serves as an operating fluid tank in which the brake fluid is stored. The mechanism for generating the hydraulic pressure by the brake pedal 9 is not limited to the configuration described above, and may be a mechanism for generating hydraulic pressure in response to the operation of the brake pedal 9, for example, a brake-by-wire type mechanism.

The hydraulic pressure generated in the master cylinder 12 is sent to a hydraulic pressure supply device 16 (hereinafter referred to as "ESC 16") via, for example, a pair of cylinder-side hydraulic pressure pipes 14A and 14B. The hydraulic pressure sent to the ESC 16 is supplied to the disc brakes 5 and 6 via brake-side piping portions 15A, 15B, 15C, and 15D. The ESC 16 is arranged between the disc brakes 5 and 6 and the master cylinder 12. The ESC 16 is a hydraulic pressure control device which controls the hydraulic pressure of the hydraulic brakes (front-wheel disc brakes 5 and rear-wheel disc brakes 6). For this purpose, the ESC 16 includes a plurality of control valves, a hydraulic pump which pressurizes the brake hydraulic pressure, an electric motor which drives the hydraulic pump, and a hydraulic pressure control reservoir which temporarily stores excess brake fluid (none of those parts are shown). Each control valve and the electric motor of the ESC 16 are connected to the ESC control device 17, and the ESC 16 includes the ESC control device 17.

The opening and closing of each control valve of the ESC 16 and the drive of the electric motor are controlled by the ESC control device 17. That is, the ESC control device 17 is an ESC control unit (ESC ECU) which controls the ESC 16. The ESC control device 17 includes a microcomputer. The microcomputer electrically drives and controls (the solenoid of each control valve and the electric motor of) the ESC 16. In this case, the ESC control device 17 includes, for example, an arithmetic circuit which controls the hydraulic pressure supply of the ESC 16 and detects a malfunction of the ESC 16, and a drive circuit which drives the electric motor and each control valve (none of those parts are shown).

The ESC control device 17 individually drives and controls (the solenoid of) each control valve of the ESC 16 and the electric motor for the hydraulic pump. As a result, the ESC control device 17 individually performs, for each of the disc brakes 5 and 6, the control of reducing, holding, boosting, or pressurizing the brake hydraulic pressure (wheel cylinder hydraulic pressure) supplied to each of the disc brakes 5 and 6 through the brake-side piping portions 15A to 15D. In this case, the ESC control device 17 executes, by controlling the operation of the ESC 16, for example, braking force distribution control, anti-lock braking control (hydraulic ABS control), vehicle stabilization control, hill-start assist control, traction control, vehicle following control, lane departure avoidance control, and obstacle avoidance control (automatic brake control and collision damage mitigation brake control).

During normal operation based on a brake operation by the driver, the ESC 16 directly supplies the hydraulic pressure generated by the master cylinder 12 to (calipers 5A and 6B of) the disc brakes 5 and 6. Meanwhile, for example, when anti-lock brake control is executed, the control valve for boosting pressure is closed to hold the hydraulic pressure of the disc brakes 5 and 6, and when the hydraulic pressure of the disc brakes 5 and 6 is reduced, the control valve for reducing the pressure is opened and the hydraulic pressure of the disc brakes 5 and 6 is released so as to escape to the hydraulic pressure control reservoir. Further, in order to perform stabilization control (sideslip prevention control) when the vehicle is traveling, when the hydraulic pressure supplied to the disc brakes 5 and 6 is boosted or pressurized, the hydraulic pump is operated by the electric motor with the supply control valve in a closed state, and the brake fluid discharged from the hydraulic pump is supplied to the disc brakes 5 and 6. At this time, on a suction side of the hydraulic pump, the brake fluid in the master reservoir 13 is supplied from the master cylinder 12 side.

Electric power from a battery 18 (or a generator to be driven by the engine), which is a vehicle power source, is supplied to the ESC control device 17 through a power supply line 19. As illustrated in FIG. 1, the ESC control device 17 is connected to the vehicle data bus 20. It is also possible to use a publicly known ABS unit in place of the ESC 16. Further, it is also possible to directly connect the master cylinder 12 and the brake-side piping portions 15A to 15D without arranging the ESC 16 (that is, omitting the ESC 16).

The vehicle data bus 20 forms a controller area network (CAN) serving as a serial communication unit mounted on the vehicle body 1. A large number of electronic devices mounted on the vehicle (for example, various types of ECUs including the ESC control device 17 and the parking brake control device 24) perform multiplex communication to and from each other in the vehicle via the vehicle data bus 20. In this case, the vehicle information transmitted to the vehicle data bus 20 is, for example, information (vehicle information) based on detection signals (output signals) from, for example, the brake operation detection sensor 10, an ignition switch, a seatbelt sensor, a door lock sensor, a door open sensor, a seat occupancy sensor, a vehicle-speed sensor, a steering angle sensor, an accelerator sensor (accelerator operation sensor), a throttle sensor, an engine-rotation sensor, a stereo camera, a millimeter-wave radar, a gradient sensor (incline sensor), a gear shift sensor (transmission data), an acceleration sensor (G sensor), a wheel-speed sensor, and a pitch sensor which detects movement in a vehicle pitch direction. Further examples of the vehicle information transmitted to the vehicle data bus 20 include a detection signal from a W/C pressure sensor 21 which detects the wheel cylinder pressure (W/C pressure) and a detection signal from an M/C pressure sensor 22 which detects the master cylinder pressure (M/C pressure).

Next, the parking brake switch 23 and the parking brake control device 24 are described.

A parking brake switch (PKB-SW) 23 serving as a switch of the electric parking brake is arranged in the vehicle body 1 at a position near the driver seat (not shown). The parking brake switch 23 serves as an operation instruction unit to be operated by the driver. The parking brake switch 23 transmits to the parking brake control device 24 a signal (operation request signal) corresponding to a parking brake operation request (application request as a holding request or release request) in response to an operation instruction by the driver. That is, the parking brake switch 23 outputs to the parking brake control device 24 an operation request signal (application request signal as a holding request signal or release request signal) for causing the piston 6D, and thus the brake pads 6C, to perform an application operation (holding operation) or a release operation based on the drive (rotation) of the electric motor 7A. The parking brake control device 24 is a parking brake control unit (parking brake ECU).

When the parking brake switch 23 is operated by the driver to the braking side (application side), that is, when there is an application request (braking holding request) for applying a braking force to the vehicle, an application request signal (parking brake request signal or application command) is output from the parking brake switch 23. In this case, electric power for rotating the electric motor 7A of the rear-wheel disc brakes 6 to the braking side is supplied to the electric motor 7A via the parking brake control device 24. At this time, the rotation-linear motion conversion mechanism 8 propels (presses) the piston 6D toward the disc rotor 4 side based on the rotation of the electric motor 7A, and holds the propelled piston 6D. As a result, the rear-wheel disc brakes 6 are in a state in which a braking force as a parking brake (or an auxiliary brake) is applied, that is, are in an application state (braking holding state).

Meanwhile, when the parking brake switch 23 is operated by the driver to the braking release side (release side), that is, when there is a release request (braking release request) for releasing the braking force of the vehicle, a release request signal (parking brake release request signal or release command) is output from the parking brake switch 23. In this case, electric power for rotating the electric motor 7A of the rear-wheel disc brakes 6 in the direction opposite to the braking side is supplied to the electric motor 7A via the parking brake control device 24. At this time, the rotation-linear motion conversion mechanism 8 releases the holding of the piston 6D by the rotation of the electric motor 7A (releases the pressing force by the piston 6D). As a result, the rear-wheel disc brakes 6 are in a state in which the braking force as a parking brake (or auxiliary brake) is released, that is, are in a released state (braking released state).

Figure 3:
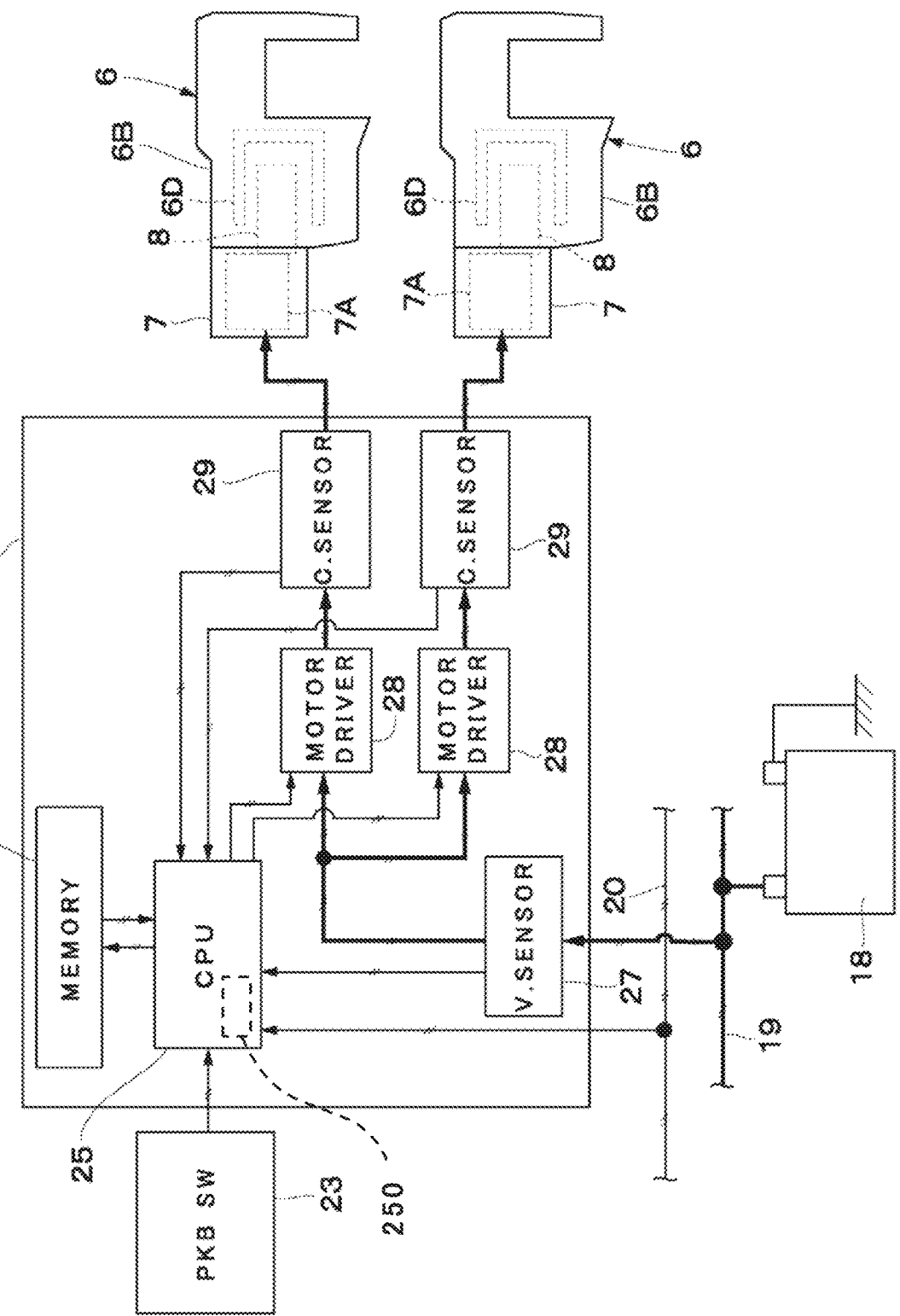
FIG. 3 is a block diagram for illustrating a parking brake control device of FIG. 1 together with a rear-wheel disc brake and other parts.

The parking brake control device 24 serving as a control device (electric brake control device) forms an electric brake device together with (the electric motor 7A and rotation-linear motion conversion mechanism 8 of) the rear-wheel disc brakes 6. The parking brake control device 24 controls the drive of the electric motor 7A. For this purpose, as illustrated in FIG. 3, the parking brake control device 24 includes an arithmetic circuit (CPU) 25 built from a microcomputer, for example, and a memory 26. Electric power from the battery 18 (or a generator driven by the engine) is supplied to the parking brake control device 24 through the power supply line 19.

The parking brake control device 24 controls the drive of the electric motors 7A and 7A of the rear-wheel disc brakes 6 and 6, and generates a braking force (parking brake or auxiliary brake) when the vehicle is parked or stopped (and during traveling as required). That is, the parking brake control device 24 operates (applies and releases) the disc brakes 6 and 6 as parking brakes (auxiliary brakes as required) by driving the left and right electric motors 7A and 7A. For this purpose, an input side of the parking brake control device 24 is connected to the parking brake switch 23 and an output side of the parking brake control device 24 is connected to the electric motors 7A and 7A of the disc brakes 6 and 6. The parking brake control device 24 includes the arithmetic circuit 25 for, for example, detecting an operation by the driver (operation of the parking brake switch 23), judging whether or not to drive the electric motors 7A and 7A, and judging whether or not to stop the electric motors 7A and 7A, and motor drive circuits 28 and 28 for controlling the electric motors 7A and 7A.

The parking brake control device 24 drives the left and right electric motors 7A and 7A based on, for example, an operation request (application request or release request) generated by the driver operating the parking brake switch 23, an operation request based on auto-application/auto-release judgment, or the like, and applies (holds) or releases the left and right disc brakes 6 and 6. At this time, in the rear-wheel disc brakes 6, the piston 6D and the brake pads 6C are held or released by the rotation-linear motion conversion mechanism 8 based on the drive of each electric motor 7A. In this way, the parking brake control device 24 drives and controls the electric motor 7A to propel the piston 6D (and thus the brake pads 6C) in response to the operation request signal for a holding operation (application) or release operation (release) of the piston 6D (and thus the brake pads 6C.)

As illustrated in FIG. 3, in addition to the memory 26 serving as a storage unit, the arithmetic circuit 25 of the parking brake control device 24 is connected to, for example, the parking brake switch 23, the vehicle data bus 20, a voltage sensor unit 27, the motor drive circuits 28, and current sensor units 29. Various types of state amounts of the vehicle required for control (operation) of the parking brake, that is, various types of pieces of vehicle information, can be acquired from the vehicle data bus 20. Further, the parking brake control device 24 can output information and commands to various types of ECUs, including the ESC control device 17, via the vehicle data bus 20 or the communication line.

The vehicle information acquired from the vehicle data bus 20 may also be acquired by directly connecting a sensor which detects the information to (the arithmetic circuit 25 of) the parking brake control device 24. Further, the arithmetic circuit 25 of the parking brake control device 24 may be configured such that an operation request based on the auto-application/auto-release judgment is input from another control device (for example, ESC control device 17) connected to the vehicle data bus 20. In this case, the auto-application/auto-release judgment control can be performed by another control device, for example, the ESC control device 17, in place of the parking brake control device 24. That is, it is possible to integrate the control content of the parking brake control device 24 into the ESC control device 17.

The parking brake control device 24 includes the memory 26 serving as a storage unit including, for example, a flash memory, a ROM, a RAM, or an EEPROM. The memory 26 stores processing programs to be used for the parking brake control. The memory 26 stores, for example, processing programs for executing the processing flows illustrated in FIG. 4 to FIG. 7 described later, that is, processing programs to be used for control processing at the time of release of the electric parking brake. In the embodiment, the parking brake control device 24 is separated from the ESC control device 17, but the parking brake control device 24 and the ESC control device 17 may be integrally configured (that is, integrated as a single braking control device). Further, the parking brake control device 24 controls two rear-wheel disc brakes 6 and 6 on the left and right, but the parking brake control device 24 may be arranged for each of the left and right rear-wheel disc brakes 6 and 6. In this case, each parking brake control device 24 may be integrally arranged with the rear-wheel disc brake 6.

As illustrated in FIG. 3, the parking brake control device 24 includes, for example, the voltage sensor unit 27 which detects the voltage from the power supply line 19, the left and right motor drive circuits 28 and 28 which drive the left and right electric motors 7A and 7A, respectively, and the left and right current sensor units 29 and 29 which detect the motor current of the left and right electric motors 7A and 7A, respectively. The voltage sensor unit 27, the motor drive circuits 28, and the current sensor units 29 are each connected to the arithmetic circuit 25. As a result, in the arithmetic circuit 25 of the parking brake control device 24, when the parking brake is applied or released, for example, the judgment (application completion judgment and release completion judgment) of stopping the drive of the electric motor 7A can be performed based on (a change in) the current value of the electric motor 7A detected by the current sensor units 29. In the illustrated example, the voltage sensor unit 27 is configured to detect (measure) the power supply voltage, but the voltage sensor unit (voltage sensor) may be configured to independently measure for the left and the right the voltage between the terminals of the electric motors 7A and 7A, for example.

It is preferred that the electric parking brake can stop the electric motor 7A, which is an actuator, in a timely manner without using a position sensor or an axial force sensor. A case in which the electric parking brake is released is now considered. For example, in a case in which the timing for stopping the electric motor 7A is early when the electric parking brake is released from an application state, the return amount of the linear motion members 8A2, which is a propulsion member, is insufficient, and a clearance amount between the brake pads 6C and the disc rotors 4 may be insufficient. As a result, the rotational resistance of the disc rotors 4 may increase. Meanwhile, when the timing for stopping the electric motor 7A is late, the return amount of the linear motion members 8A2 becomes excessive (too large), and the time until thrust is generated at the next application operation may be too long. That is, the responsiveness at the time of application may decrease.

Figure 14:
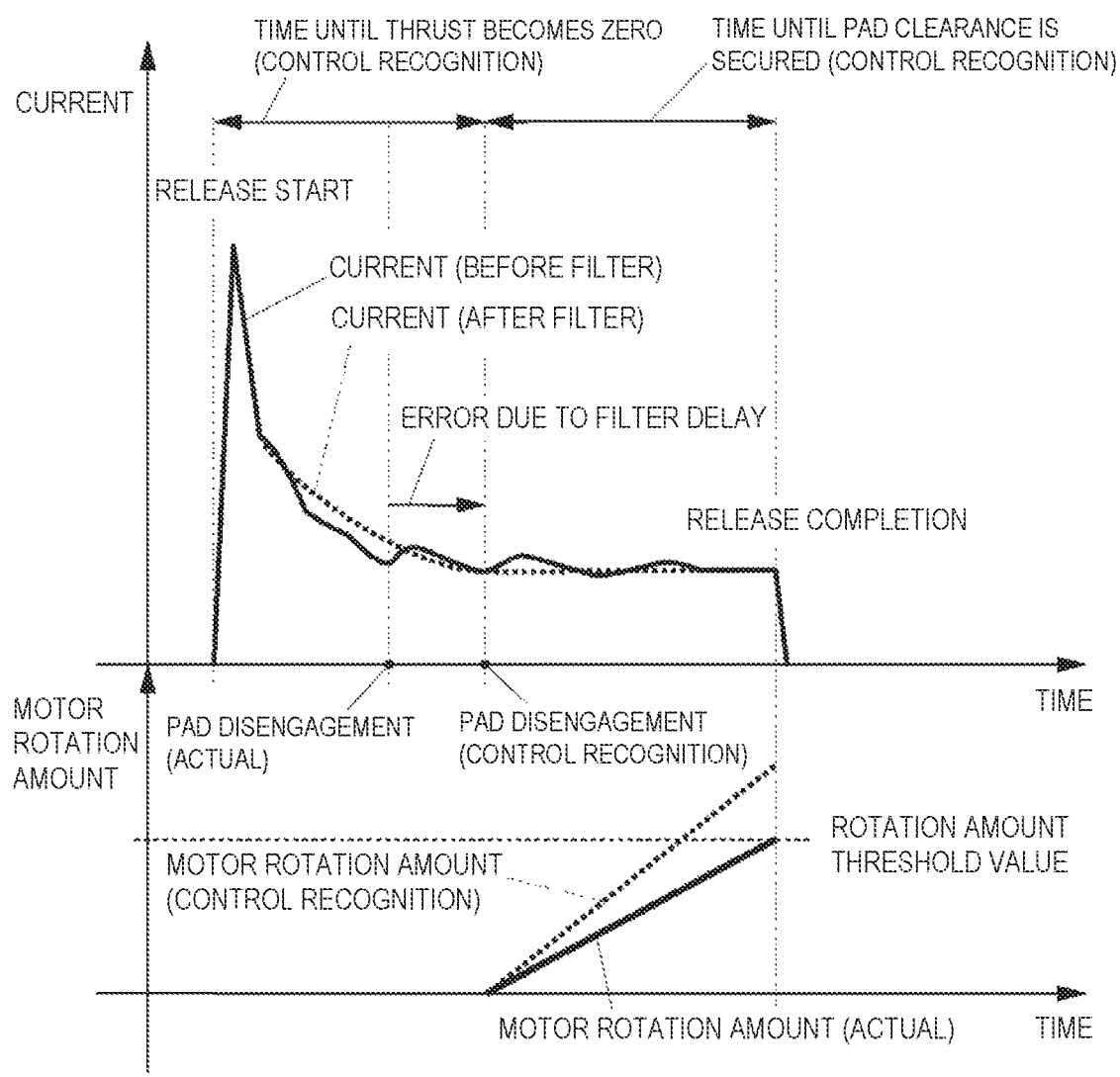
FIG. 14 is an explanatory graph for showing an error in filter delay and an error in motor rotation amount.

In order to suppress such an issue, for example, as shown in FIG. 14, by judging that the thrust (braking force) has been released based on the current and voltage waveforms of the electric motor, and appropriately regulating the control amount (motor rotation amount) of the electric motor after that, the displacement amount (return amount) of the propulsion member, and further, the clearance amount, may be secured. However, a judgment that the thrust has been released (in other words, a judgment that the brake pads have disengaged), requires the use of a filter having a large time constant in order to suppress the influence of noise and ripple. As a result, it may be difficult to accurately secure the clearance due to a delay caused by the filter. When the electric motor is controlled using a motor rotation amount estimated from the current and voltage waveforms, it is required to determine a threshold value of the motor rotation amount for stopping the electric motor in consideration of, for example, the variation in the characteristics of the electric motor and the generated force at the time of release. Moreover, a monitoring error in the current and voltage occurs during the calculation of each cycle, and hence the error may increase by the required calculation time. Therefore, it is required to set a large threshold value for the motor rotation amount for stopping the electric motor, and from this aspect as well, it may be difficult to accurately secure the clearance.

More specifically, the disc brake device of Patent Literature 1 described above judges that the brake pads have disengaged based on whether or not a derivative value of the motor current has settled down to a constant value. However, ripples occur in the actual current waveform. In addition, the friction of the threaded portion of the rotation-linear motion mechanism varies depending on the screw position, which causes the current to change. Owing to those factors, it is considered difficult to accurately judge that the pads have disengaged. Meanwhile, in order to achieve an accurate judgment, it is conceivable to use a filter which is not easily affected by current. However, in this case, there may be a delay with respect to changes in current, and it may be difficult to achieve control accuracy. Further, in the disc brake device of Patent Literature 1, a clearance is secured by the motor rotation amount. In this case, the motor rotation amount is calculated by integrating the number of rotations calculated from the voltage and current. However, monitoring errors in the current and voltage and errors due to the motor constant and resistance may be integrated. As a result, as the motor rotation amount becomes larger, the clearance variation increases, and there is a possibility that sufficient control accuracy of the electric motor is not achieved.

In contrast, in the embodiment, a disengagement state of the brake pads 6C is judged by a "width of the current of the electric motor 7A" estimated based on, for example, the ripple of the electric motor 7A, the variation of the threaded portion of the rotation-linear motion conversion mechanism 8, and the variation of other mechanism, so as to accurately secure the clearance, and the control amount after disengagement is controlled by using "time." for which there are few factors causing errors. In this case, "time." which is a control amount after disengagement, is corrected based on a "constant current value after disengagement of the brake pads 6C" and the "current value at which the current enters the current width of the judgment of the disengagement state." As a result, the control accuracy can be improved as compared with a case in which the "rotation amount" is used as the control amount after disengagement. In addition, the control accuracy can be improved as compared with a case in which "time" after disengagement is not corrected.

Figure 13:
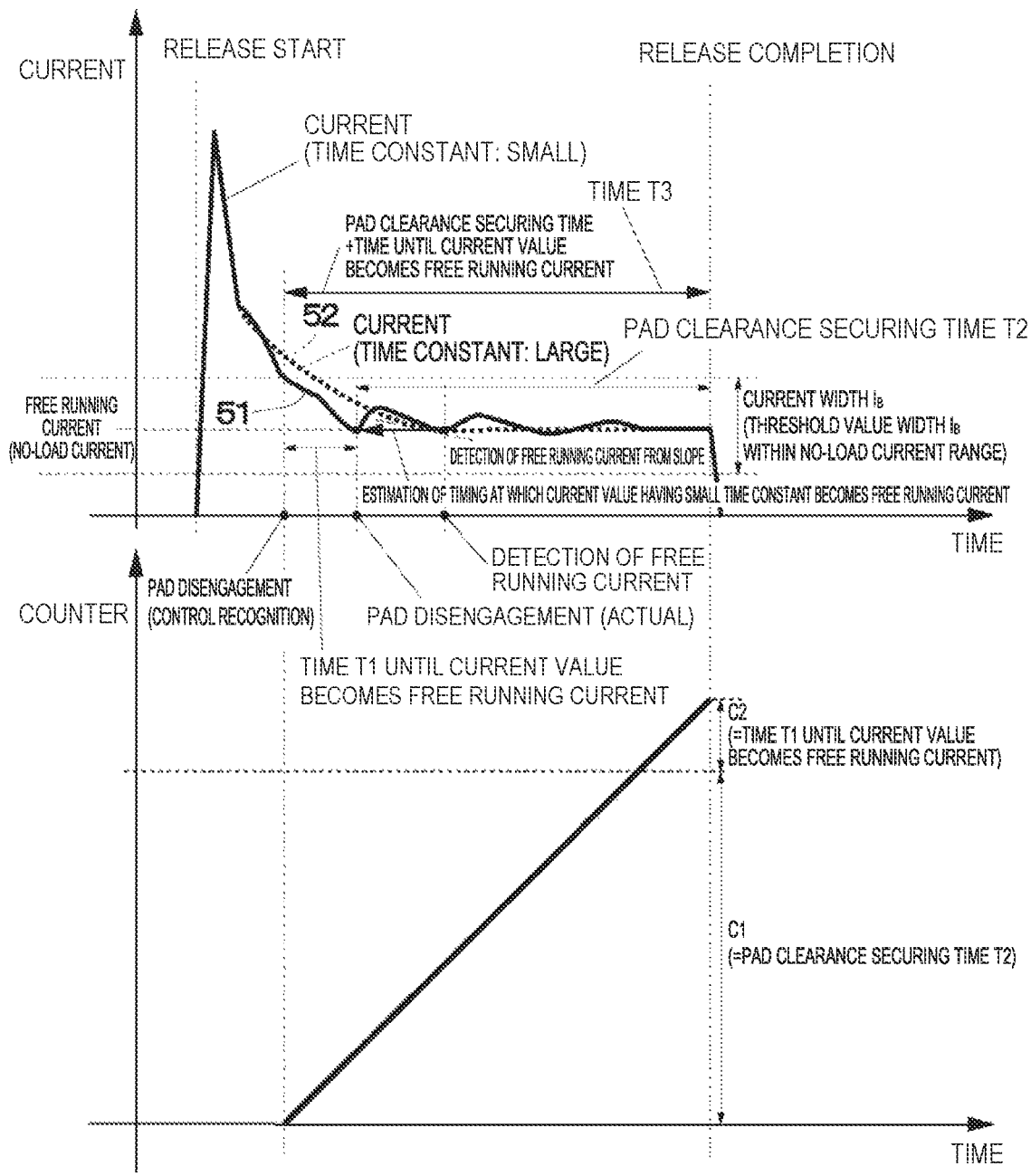
FIG. 13 is an explanatory graph for showing processing of determining a drive time of the electric motor based on current values acquired by a filter having a large time constant and a filter having a small time constant.

That is, as shown in FIG. 13, in the embodiment, the current of the electric motor 7A is acquired from a filter having a large time constant and a filter having a small time constant. In FIG. 13, a current 51 of the electric motor 7A acquired from a filter having a small time constant is indicated by a solid characteristic line, and a current 52 of the electric motor 7A acquired from a filter having a large time constant is indicated by a broken characteristic line. In the embodiment, the time point at which the current 51 acquired from the filter having a small time constant enters a constant current width IB (threshold value width IB within a no-load current range described later) is judged to be a provisional pad disengagement (control-recognized pad disengagement). Further, a free running current value (that is, a current value at which the electric motor 7A advances at zero thrust, namely, a no-load current value ID described later) is detected from the slope of the current 52 acquired from the filter having a large time constant.

Then, release is judged to be complete when a time T3 (time Tc described later), which is the sum of a "time T1 (time Tb described later) from when the current 51 of the electric motor 7A acquired from the filter having a small time constant enters the range of the constant current width IB until the current reaches the free running current value (no-load current value ID)" and a "time T2 (time Ta described later) required to secure a clearance," elapses, and the electric motor 7A is stopped. The time T1 corresponds to a counter value C1 and the time T2 corresponds to a counter value C2. When the counter value becomes a value obtained by adding C1 and C2, the electric motor 7A is stopped. As a result, the influence of noise such as ripple generated in the current waveform at the time of release can be reduced, and the clearance can be accurately secured.

Therefore, in the embodiment, as shown in FIG. 4 to FIG. 12, when the parking brake control device 24 releases the hold on the braking force, the parking brake control device 24 energizes the electric motor 7A, and changes a drive time (time Tc described later) of the electric motor 7A in accordance with a current change amount in a predetermined interval (interval of the time Tb described later) after a predetermined time has elapsed since the current value of the electric motor 7A starts to decrease after increasing and the current value at which the current change amount of the electric motor 7A converges to a predetermined value (threshold value Df described later) or less. In this case, the predetermined time can be set as, for example, the time at which an inrush current converges. That is, at the time of the release, when the inrush current converges, the parking brake control device 24 changes the drive time (time Tc) of the electric motor 7A in accordance with the "current change amount of the electric motor 7A in the predetermined interval (interval of the time Tb)" and the "current value (no-load current value ID) at which the current change amount converges to the predetermined value (threshold value Df) or less." As described later, the predetermined interval (interval of the time Tb) changes in accordance with a variation width of the current value depending on a temperature of the electric motor 7A. Further, the current value (no-load current value ID) at which the current change amount of the electric motor 7A converges to the predetermined value (threshold value Df) or less is detected from the current waveform obtained by a differential filter 250 (shown in FIG. 3).

In order to perform such control, the parking brake control device 24 includes a storage area for temporarily storing the current value at predetermined cycles. More specifically, the parking brake control device 24 includes a ring buffer (circular buffer) for sequentially storing the current value of each control cycle in a buffer. The number of buffers of the ring buffer for storage is set in advance. For example, the ring buffer stores the current values in order from a first buffer (zeroth buffer in the array), and when the number of buffers used for storage is exceeded, that is, when a current value is stored in the last buffer, the ring buffer returns to the beginning (zeroth buffer in the array), and continues storing (overwriting and updating) while discarding the previously stored current values in order.

As a result, when the parking brake control device 24 releases the hold on the braking force, the parking brake control device 24 energizes the electric motor 7A, and changes the drive time (time Tc) of the electric motor 7A based on a current value acquired each predetermined cycle after the current value of the electric motor 7A increases and then decreases to enter the predetermined current value range (threshold value width IB within the no-load current range) and the current value (no-load current value ID) at which the current value becomes substantially constant. That is, at the time of release, the parking brake control device 24 changes the drive time (time Tc) of the electric motor 7A based on the "current value acquired each predetermined cycle after the current value enters the predetermined current value range (threshold value width IB within the no-load current range)" and the "current value (no-load current value ID) at which the current value acquired each predetermined cycle becomes substantially constant." As described later, the current value range (threshold value width IB within the no-load current range) changes in accordance with the variation width of the current value depending on the temperature of the electric motor 7A. The current value (no-load current value ID) at which the current value becomes substantially constant is a current value at which a change in a derivative value of the current value obtained by the differential filter becomes equal to or less than a predetermined value. The control of the release drive of the electric motor 7A by the parking brake control device 24, that is, the control processing illustrated in FIG. 4 to FIG. 7, is described in detail later.

The four-wheeled automobile brake system in the embodiment has the configuration described above, and the operation of that brake system is now described next.

When the driver of the vehicle steps on and operates the brake pedal 9, the stepping force is transmitted to the master cylinder 12 via the booster 11, and brake hydraulic pressure is generated by the master cylinder 12. The brake hydraulic pressure generated in the master cylinder 12 is supplied to each of the disc brakes 5 and 6 via the cylinder-side hydraulic pressure pipes 14A and 14B, the ESC 16, and the brake-side piping portions 15A, 15B, 15C, and 15D to apply a braking force to each of the left and right front wheels 2 and each of the left and right rear wheels 3.

In this case, in each of the disc brakes 5 and 6, the pistons 5B and 6D are slidably displaced toward the brake pads 6C as the brake hydraulic pressure in the calipers 5A and 6B rises, and the brake pads 6C are pressed against the disc rotors 4 and 4. As a result, a braking force based on the brake hydraulic pressure is applied. Meanwhile, when the brake operation is released, the supply of the brake hydraulic pressure to the calipers 5A and 6B is stopped, which causes the pistons 5B and 6D to move away (retract) from the disc rotors 4 and 4. As a result, the brake pads 6C separate from the disc rotors 4 and 4, and the vehicle returns to a non-braking state.

Next, when the driver of the vehicle operates the parking brake switch 23 to the braking side (application side), power is supplied from the parking brake control device 24 to the electric motor 7A of the left and right rear-wheel disc brakes 6, and the electric motor 7A is rotated and driven. In the rear-wheel disc brakes 6, the rotational motion of the electric motor 7A is converted into a linear motion by the rotation-linear motion conversion mechanism 8, and the piston 6D is propelled by the rotation-linear motion member 8A. As a result, the disc rotor 4 is pressed by the brake pads 6C. At this time, the rotation-linear motion conversion mechanism 8 (linear motion member 8A2) holds a braking state by a frictional force (holding force) produced by screwed engagement, for example. As a result, the rear-wheel disc brakes 6 are operated (applied) as a parking brake. That is, even after the power supply to the electric motor 7A is stopped, the piston 6D is held at the braking position by the rotation-linear motion conversion mechanism 8.

Meanwhile, when the driver operates the parking brake switch 23 to the braking release side (release side), power is supplied from the parking brake control device 24 to the electric motor 7A so that the motor is driven in reverse. As a result of this power supply, the electric motor 7A is rotated in the direction opposite to the direction taken when the parking brake is operated (applied). At this time, the holding of the braking force by the rotation-linear motion conversion mechanism 8 is released, and the piston 6D can be displaced in the direction away from the disc rotor 4. As a result, the rear-wheel disc brakes 6 are released from the operation as a parking brake.

Figure 5:
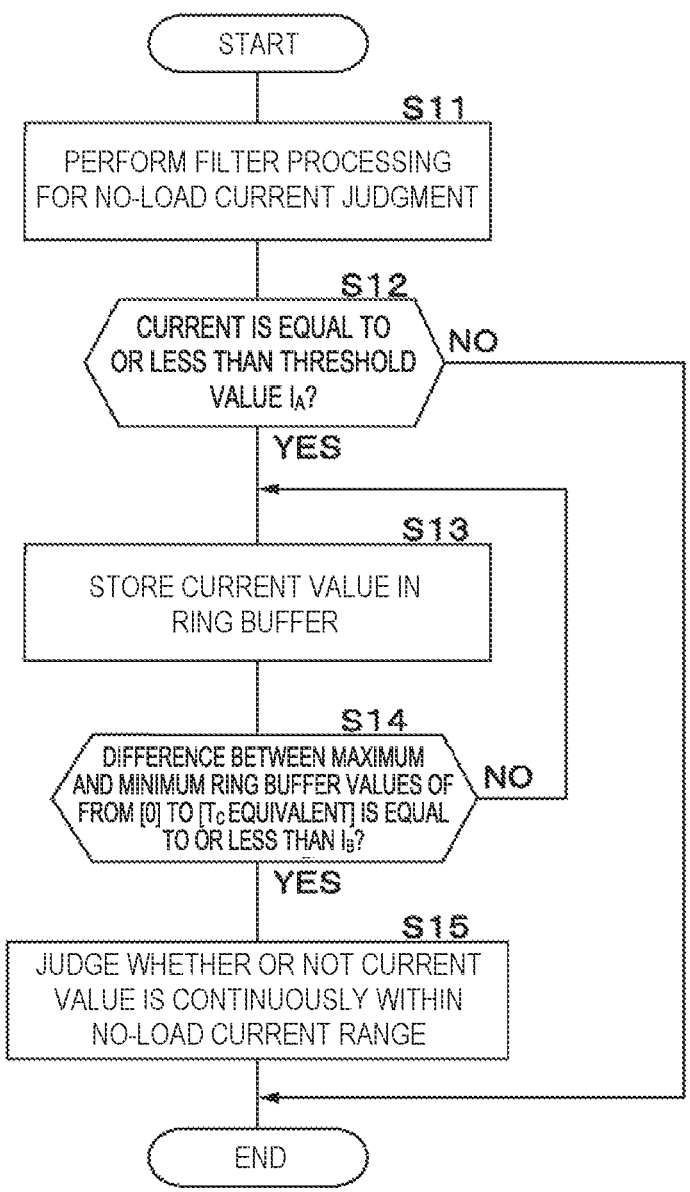
FIG. 5 is a flowchart for illustrating processing of judgment of Step S5 of FIG. 4 of whether or not a current value is continuously within a no-load current range.
Figure 6:
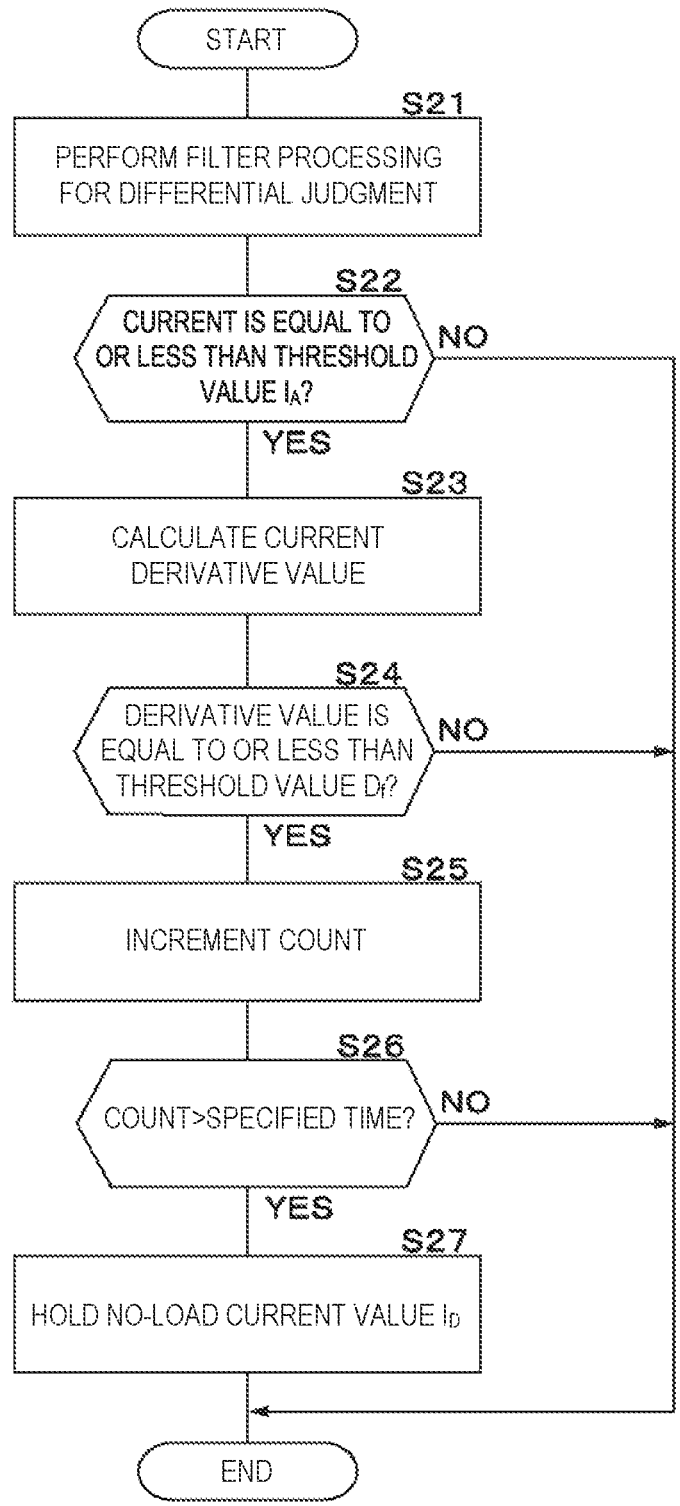
FIG. 6 is a flowchart for illustrating processing of judgment of a no-load current value (free running current value).
Figure 7:
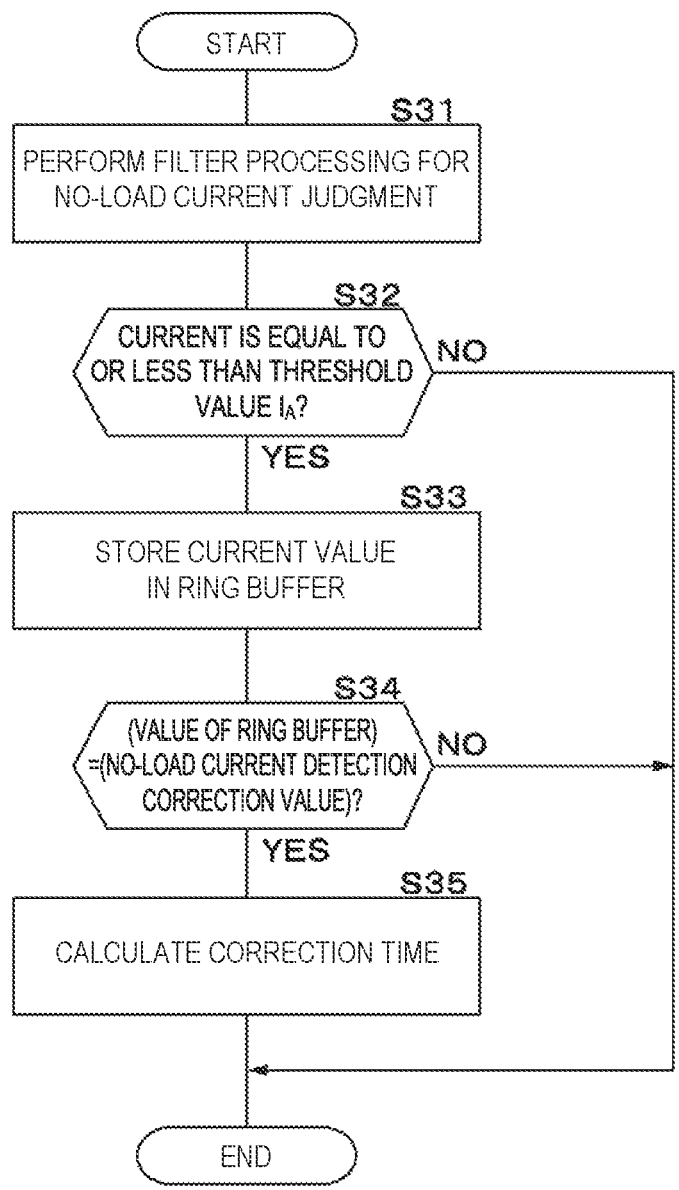
FIG. 7 is a flowchart for illustrating processing of a correction time calculation.
Figure 8:
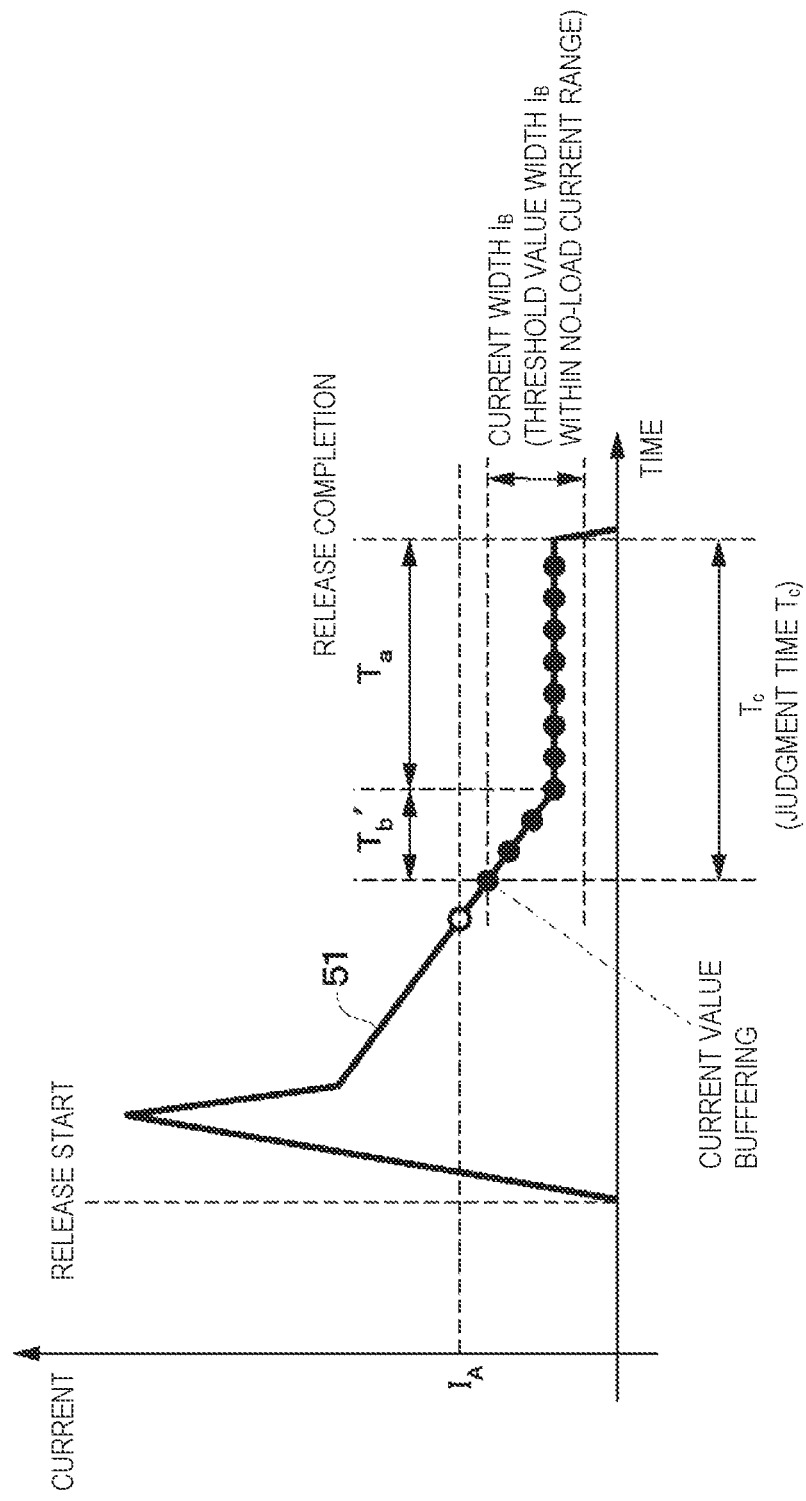
FIG. 8 is a characteristic curve diagram for showing an example of change over time in a current value of an electric motor.
Figure 9:
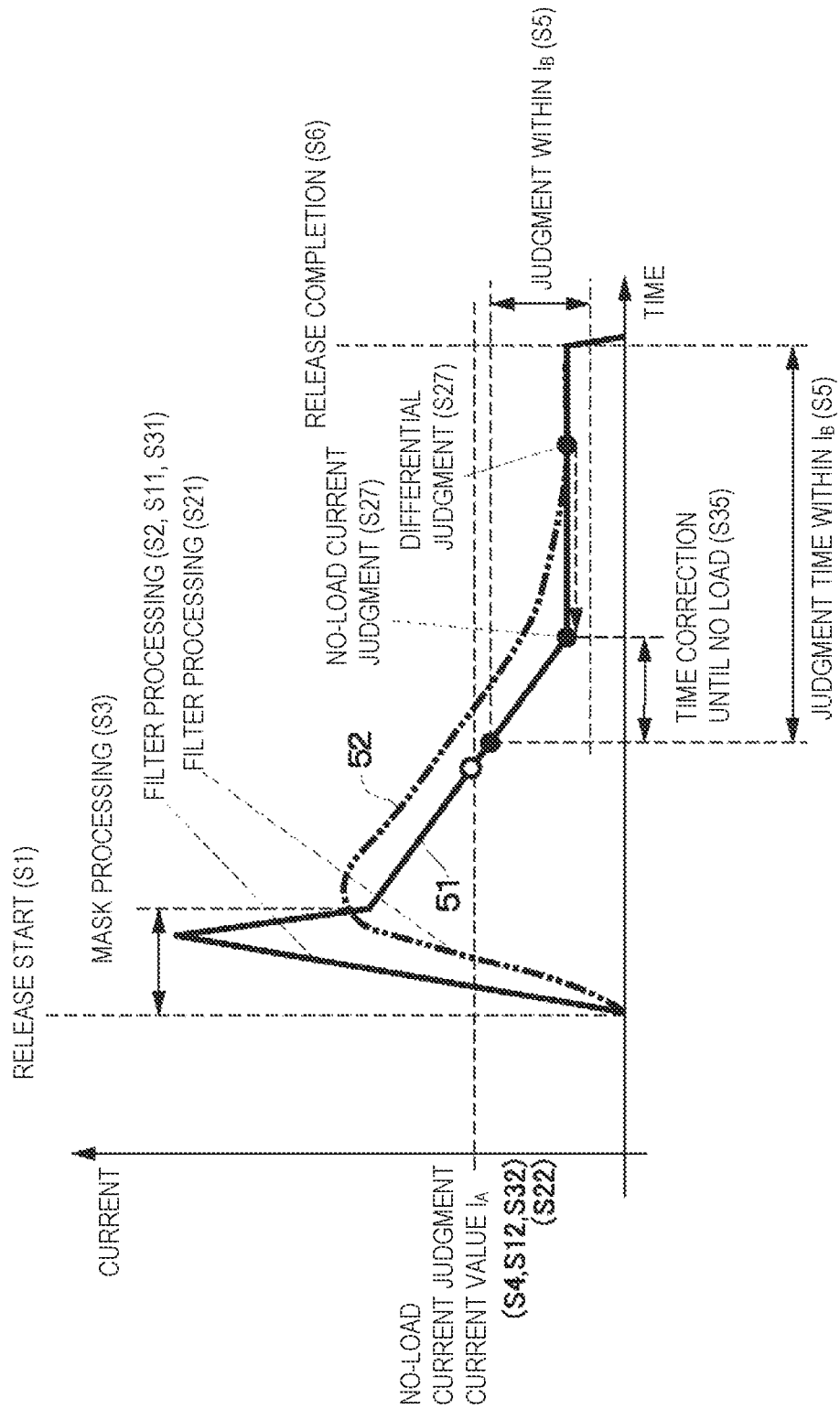
FIG. 9 is an explanatory graph for showing the example of change over time in the current value of the electric motor together with the corresponding control processing (step numbers).
Figure 10:
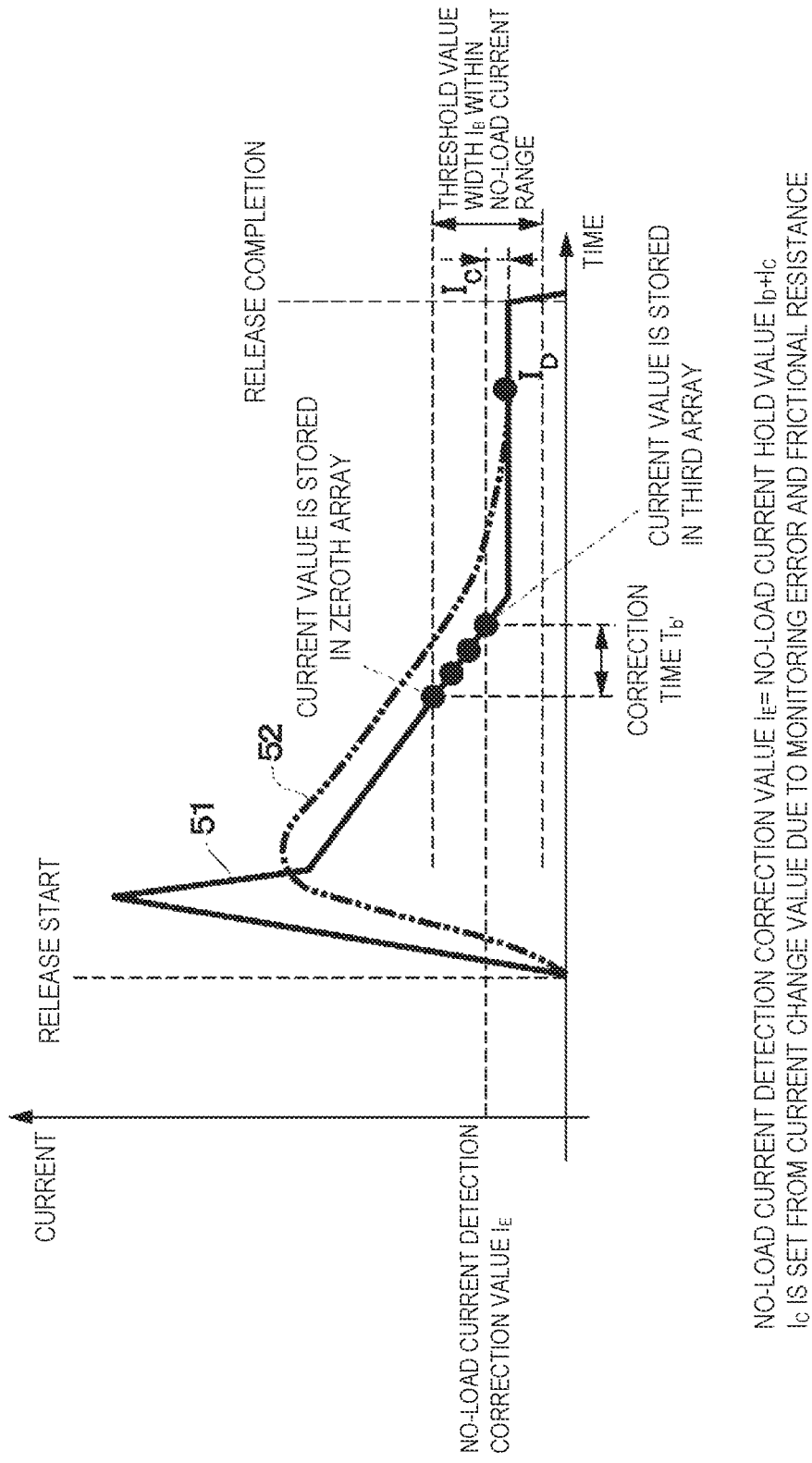
FIG. 10 is an explanatory graph for showing the example of change over time in the current value of the electric motor together with correction time calculation processing.

Next, the control processing performed by the arithmetic circuit 25 of the parking brake control apparatus 24 is described with reference to FIG. 4 to FIG. 7. The control processing of FIG. 4 to FIG. 7 is repeatedly executed in a predetermined control cycle (for example, 10 ms) during the period in which the parking brake control apparatus 24 is energized, for example. Further, in FIG. 8, a relationship between the change over time in the current value of the electric motor 7A and the drive time (judgment time Tc) of the electric motor 7A judged by the control processing of FIG. 4 to FIG. 7 is shown. In FIG. 9, a relationship between the change over time in the current value of the electric motor 7A and each step of the control processing of FIG. 4 to FIG. 7 is shown. In FIG. 10, a relationship between the change over time in the current value of the electric motor 7A and correction time calculation processing of FIG. 7 is shown. In FIG. 8 to FIG. 10, the current values stored in the ring buffer are represented by circles on the characteristic curve (on the current 51) (the same applies in FIG. 11 and FIG. 12 described later).

Figure 4:
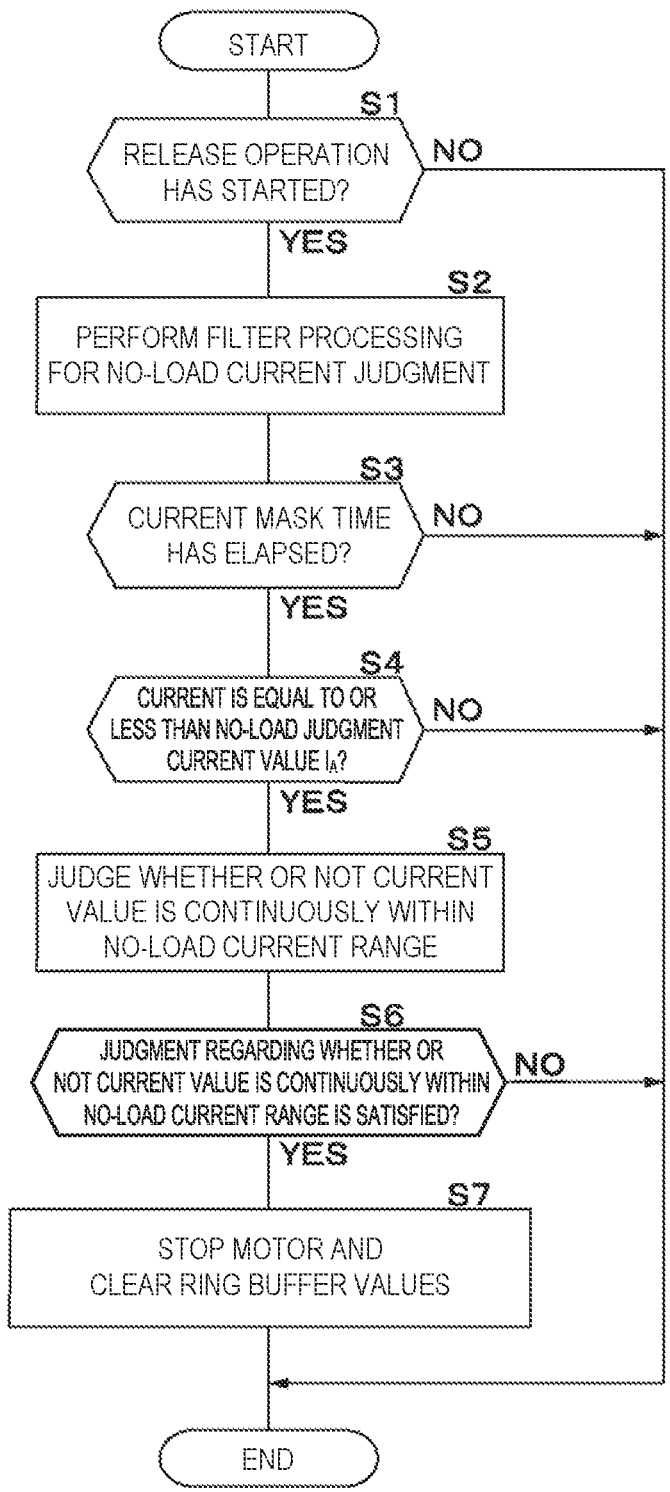
FIG. 4 is a flowchart for illustrating release control processing performed by the parking brake control device of FIG. 1.

When the parking brake control apparatus 24, which is an electronic control unit (ECU), is activated, the control processing of FIG. 4 is started. In Step S1, the parking brake control device 24 judges whether or not a release operation has started. That is, when a release command is output based on operation of the parking brake switch 23 to the release side, or when a release command is output based on release judgment logic of the parking brake, power is supplied to the electric motor 7A. As a result, the electric motor 7A is driven in a release direction. In Step S1, the judgment regarding whether or not the electric motor 7A has started to be driven is based on the release command.

When Step S1 is judged to be "NO," that is, when it is judged that release has not started (drive of the electric motor 7A in the release direction has not started), the process returns to the start. That is, the process advances to "end" of FIG. 4, then returns to "start," and the processing steps after Step S1 are repeated. Meanwhile, when Step S1 is judged to be "YES," that is, when it is judged that release has started, the process advances to Step S2. In this case, that is, when Step S1 of FIG. 4 is judged to be "YES," the processing of FIG. 5 to FIG. 7 is also started. The processing of FIG. 5 to FIG. 7 is described later.

In Step S2, the current signal of the electric motor 7A detected by the current sensor unit 29 is filtered. That is, in Step S2, filter processing for the no-load current judgment is performed. The filter is set in consideration of, for example, a task cycle and a delay time. In the embodiment, for example, a cutoff frequency is set to 50 Hz or less and a 90% response is set to 10 ms or less of a control judgment cycle for a 1 ms signal. In addition, the filter may be set to have values other than those values in order to improve responsiveness. In FIG. 8 to FIG. 10, the current 51 acquired by the filter processing of Step S2 (and Step S11 of FIG. 5 and Step S31 of FIG. 7) is indicated by a solid characteristic line.

In Step S3 following Step S2, it is judged whether or not a current mask time has elapsed since release started. That is, in Step S3, it is judged whether or not a sufficient time has elapsed in order for the inrush current generated immediately after the start of rotation of the electric motor 7A to converge. This time (current mask time) can be, for example, a value in which a margin is taken into consideration in the sum of a "time from when release is judged to have started until a relay operation" and a "time during which the inrush current continues." The start of release can be judged based on the output of the release command. When Step S3 is judged to be "NO," that is, when it is judged that the current mask time has not elapsed since the start of release (release command output), the process returns to the start. Meanwhile, when Step S3 is judged to be "YES," that is, when it is judged that the current mask time has elapsed since the start of release (release command output), the process advances to Step S4.

In Step S4, it is judged whether or not the current value of the electric motor 7A having been subjected to the filter processing in Step S2 is equal to or less than a no-load judgment current value IA. That is, in Step S4, it is judged whether or not the current value after the mask time has elapsed from the release start has entered a no-load state region. The no-load state corresponds to a state in which the pistons 6D have separated from the brake pads 6C, in other words, a state in which the linear motion members 8A2 have separated from the pistons 6D. The no-load judgment current value IA, that is, the threshold value IA of the current to be used for judgment of whether or not the current is in a no-load state, can be set from an upper limit value in consideration of the current variation in the no-load state. The factors of the current variation are determined by considering all of the following, that is, change in characteristics due to temperature, mechanical resistance of the components, viscous resistance, and variation in efficiency.

Specifically, the factors of the current variation are determined in consideration of variation in torque due to the sliding resistance of parts which rotate or linearly move, such as screws, bearings, and O-rings, variation in torque due to the viscous resistance of grease, motor inductance resistance, torque constants, inertia, and motor resistance (harness resistance, coil resistance, and resistance between terminals). In addition to those factors, the current value may also be calculated by adding factors causing changes in torque and current in the no-load state. The threshold value IA of the no-load judgment is set in advance based on, for example, calculation, experimentation, testing, or simulation. When Step S4 is judged to be "NO," that is, when it is judged that the current value of the electric motor 7A is larger than the no-load judgment current value IA, the process returns to the start. Meanwhile, when Step S4 is judged to be "YES," that is, when it is judged that the current value of the electric motor 7A is equal to or less than the no-load judgment current value IA, the process advances to Step S5.

In Step S5, it is judged whether or not the current value is continuously within the no-load current range. That is, in Step S5, based on the processing of FIG. 5, it is judged whether or not the current value of the electric motor 7A is continuously within the predetermined current width IB (that is, within the threshold value width IB within the no-load current range). The release time is generally about one second, and the temperature of the electric motor 7A during release within that time can be regarded as almost constant. Therefore, the judgment is performed by utilizing the fact that, in the no-load current range in which all variations have been considered, that is, in the range equal to or less than the no-load judgment current value IA, the fluctuation range of the no-load current can be defined by the narrower current width IB (IA>IB). The current width IB, which is the threshold value width within the no-load current range, can be calculated by excluding the temperature characteristic change element from the above-mentioned fluctuating elements of the no-load judgment current value IA. In Step S5, that is, in the processing of FIG. 5, it is judged whether or not the current value of the electric motor 7A is continuously within the threshold value width IB within the no-load current range.

When Step S1 of FIG. 4 is judged to be "YES," the processing of FIG. 5 (processing of judging whether or not the current value is continuously within the no-load current range) starts. Step S11 of FIG. 5 is the same processing step as Step S2 of FIG. 4, and Step S12 of FIG. 5 is the same processing step as Step S4 of FIG. 4. When Step S12 of FIG. 5 is judged to be "NO," the process returns to the start. That is, the process advances to "end," then returns to "start," and the processing steps after Step S11 are repeated. When Step S12 is judged to be "YES," the process advances to Step S13. In Step S13, the current value is stored in the ring buffer. That is, in Step S13, the current value is stored in the ring buffer every cycle in order to judge whether or not the current value is continuously within the no-load current range. The required number of times that storage is performed can be the sum of, for example, the maximum of the time Ta required to secure the clearance of the brake pads 6C and an estimated maximum time Tb until the current value settles at the no-load current value after entering the threshold value width IB within the no-load current range.

The maximum time of Ta can be set based on a "required clearance," a "screw lead," a "reduction ratio," and a "motor rotation speed (slowest condition)." That is, a pad clearance securing time Ta is given by the following Formula (1).

$$T_a = \frac{\left(\frac{\text{required clearance}}{\text{lead}}\right) \times \text{reduction ratio}}{\text{motor rotation speed}} \quad \text{[Formula 1]}$$

Here, Tb depends on the threshold value width IB within the no-load current range and the gradient of the decrease in thrust (rigidity), and thus Tb can be calculated from the lowest conditions of the estimated caliper rigidity and pad rigidity. The calculation formula is the following Formula (2).

$$T_b = \frac{\text{sliding screw rotation amount [mm] when changing by } I_B}{\text{sliding screw rotation speed [mm/s]}} \quad \text{[Formula 2]}$$

Formula (2) becomes the following Formula (3).

$$T_b = \frac{\left(\frac{\text{rigidity [mm/kn]}}{\text{torque-to-thrust conversion coefficient [Nm/kN]}} \times \text{torque constant [Nm/A]}\right) \times I_B[A]}{(\text{motor rotation speed [rpm]} \div 60 \div \text{reduction ratio [-]} \times \text{lead [mm/rev]})} \quad \text{[Formula 3]}$$

In Step S13 following Step S14, it is confirmed, based on the difference between the maximum and minimum current values stored in the ring buffer, whether or not the change in the current value is within the threshold value width IB within the no-load current range, and whether the current value is in the no-load state is monitored. That is, in Step S14, it is judged whether or not the difference between the maximum and the minimum ring buffer values of from [0] to [Tc equivalent] is equal to or less than the threshold value width IB within the no-load current range. The judgment is performed after current values have accumulated in the ring buffer from [0] to [Tc equivalent]. Until then, the current values are stored in the ring buffer (process returns to Step S13). Here, Tc corresponds to the time (judgment time Tc) obtained by adding a pad clearance securing time Ta and a correction time Tb' described later (Tc=Ta+Tb' (maximum of Tb' is Tb'=Tb)). When Step S14 is judged to be "NO," that is, when it is judged that the difference between the maximum and the minimum of the ring buffer values exceeds the threshold value width IB within the no-load current range, the process returns to before Step S13. Meanwhile, when Step S14 is judged to be "YES," that is, the difference between the maximum and the minimum of the ring buffer values is equal to or less than the threshold value width IB within the no-load current range, the process advances to Step S15.

When the sliding resistance of an O-ring or bearing changes due to the generation of hydraulic pressure, and the current value exceeds the threshold value width IB within the no-load current range. Step S14 is not satisfied, and the processing steps of Step S13 and Step S14 are continued. As a result of the processing steps of Step S13 and Step S14, it is judged that the fluctuation range of the no-load current is within the threshold value width IB within the no-load current range in accordance with the position at which the actual free running current settles down within the no-load current range (within the range equal to or less than the no-load judgment current value IA).

In Step S15, as shown in FIG. 8, based on the judgment of Step S14, that is, by judging that the no-load state at a certain temperature has continued for the judgment time Tc, it is judged that the judgment of whether or not the current value is continuously within the no-load current range is satisfied, and the process returns to the start. In this case, Step S6 of FIG. 4 is judged to be "YES." The judgment time Tc is the sum of the above-mentioned time Ta and the correction time Tb' calculated by the differential judgment processing illustrated in FIG. 6 and the correction time calculation processing illustrated in FIG. 7 (Tc=Ta+Tb'). The correction time Tb' is calculated by the correction time calculation processing illustrated in FIG. 7 by using the no-load current value ID (free running current value) calculated by the differential judgment processing illustrated in FIG. 6.

The differential judgment processing of FIG. 6 is now described. When Step S1 of FIG. 4 is judged to be "YES," the processing of FIG. 6 (differential judgment processing) starts. In Step S21, filter processing for differential judgment is performed. That is, in Step S21, in order to remove the influence of ripple and noise, large time constant filter processing is performed. More specifically, in Step S21, the current signal of the electric motor 7A is subjected to filter processing by using a filter (differential filter) having a time constant which is larger than that in Step S2 of FIG. 5, Step S11 of FIG. 6, and Step S31 of FIG. 7 described later. The calculation of the correction time is required to be completed before the pad clearance is secured. Therefore, in Step S21, for example, the filter processing is performed such that a 90% response is achieved for a time obtained by subtracting a margin from the required count (required time) of the ring buffer described above. In FIG. 9 and FIG. 10, the current 52 acquired by the filter processing of Step S21 is indicated by an alternate long and short dash characteristic line.

In Step S22 following Step S21, it is judged whether or not the current value of the electric motor 7A having been subjected to the filter processing in Step S21 is equal to or less than the no-load judgment current value IA. When Step S22 is judged to be "NO," the process returns to the start. That is, the process advances to "end," then returns to Step S21, and the processing steps after Step S21 are repeated. Meanwhile, when Step S22 is judged to be "YES," the process advances to Step S23. In Step S23, the current derivative value is calculated. Step S24 to Step S26 are steps for judging that the state in which the current derivative value is equal to or less than the threshold value Df continues for a specified time (predetermined time). The threshold value Df of the current derivative value is a threshold value for judging that the current is the no-load current value ID (FIG. 10), and can be any value between a slope Db of the current when the thrust decreases most slowly and a derivative value Dc when the current has changed by a current width assumed at the time of no-load (Dc<Df<Db). The slope of the current can be calculated in consideration of, for example, the rigidity, a sliding resistance of rotation or linear motion, and specifications of the motor. The specified time can be set as a time for appropriately judging that the current has converged to the no-load current value ID (time for judging that the derivative value has settled to Df or less).

In Step S24, it is judged whether or not the current derivative value calculated in Step S23 is equal to or less than the threshold value Df. When Step S24 is judged to be "NO," that is, when it is judged that the current derivative value exceeds the threshold value Df, the process returns to the start. Meanwhile, when Step S24 is judged to be "YES," that is, when it is judged that the current derivative value is equal to or less than the threshold value Df, the process advances to Step S25. In Step S25, a counter is incremented up, and in the following Step S26, it is judged whether or not the counter has exceeded the specified time. When Step S26 is judged to be "NO," that is, when it is judged that the counter is within the specified time, the process returns to the start. Meanwhile, when Step S26 is judged to be "YES," that is, when it is judged that the counter exceeds the specified time, the process advances to Step S27. In Step S27, the current value at the time when the process advances to Step S27 is held as the no-load current value ID. That is, in Step S27, the current value at the time when the derivative value settles to Df or less is held as the no-load current value ID, and the process returns to the start.

Next, the correction time calculation processing of FIG. 7 is described. In the correction time calculation processing, the time until the current value falls within the threshold value width IB within the no-load current range is corrected based on the actual waveform. The aim of this processing is to calculate the time from the first current buffer value entering the threshold value width IB within the no-load current range until the current value becomes the no-load current value ID calculated by the above-mentioned differential judgment. Step S31 to Step S33 of FIG. 7 are the same processing steps as Step S11 to Step S13 of FIG. 4. That is, in Step S31, filter processing for the no-load current judgment is performed, and in Step S32, it is determined that the current value has become a current value IA or less which can be determined as a no-load state. When Step S32 is judged to be "NO," the process returns to the start. That is, the process advances to "end," then returns to "start," and the processing steps after Step S31 are repeated. When Step S32 is judged to be "YES," the process advances to Step S33. In Step S33, the current value is stored in the ring buffer (the same buffer value as in the no-load current calculation is used). In Step S34 following Step S33, a comparison is performed with a no-load current equivalent value IE (also referred to as "no-load current detection correction value IE") in order from the zeroth array of the ring buffer.

That is, in Step S34, it is judged whether or not the value of the ring buffer and the no-load current equivalent value IE match. As shown in FIG. 10, the no-load current equivalent value IE is a current obtained by adding a fluctuation amount (IC) due to the changes in sliding resistance in the no-load state and monitoring error to the no-load current value ID calculated by the above-mentioned differential judgment. The time constant of the filter in this processing (correction time calculation processing) is set lower than the time constant of the filter in the differential judgment, and hence the no-load current equivalent value IE is set in consideration of the influence of fluctuations. When Step S34 is judged to be "NO," that is, when it is judged that the value of the ring buffer does not match the no-load current equivalent value IE, the process returns to the start. When Step S34 is judged to be "YES," that is, when it is judged that the value of the ring buffer matches the no-load current equivalent value IE, the process advances to Step S35. In Step S35, the correction time is calculated from the ring buffer array (for example, N-th array) judged to be matching in Step S34. As shown in FIG. 10, the zeroth array is regarded as the point at which the current value enters the threshold value width IB within the no-load current range, and the N-th array (for example, the third array) is regarded as the point at which the no-load current is reached, and hence that interval becomes the time interval to be corrected. That is, the correction time Tb' can be expressed by the following Formula (4) from the number of arrays N and the task cycle (control cycle).

$$\text{correction time } Tb' = N \times \text{task cycle} \qquad \text{[Formula 4]}$$

For the correction time Tb' a default time Toriginal may be set in advance, and the difference from that value may be provided as feedback. In this case, when the correction time Tb' is longer than the default time Toriginal (Tb'>Toriginal), the judgment time Tc is controlled for a time longer than the specified time. This is in order to be able to handle cases in which the slope of the current waveform becomes gradual due to unexpected frictional resistance of the brake pads 6C. In any case, when the correction time Tb' has been calculated in Step S35, the process returns to the start. The correction time Tb' calculated in Step S35 is added to the pad clearance securing time Ta, and used as the judgment time Tc in Step S14 of FIG. 5 (Tc=Ta+Tb').

In Step S14 and Step S15, when the difference between the maximum and minimum current values stored in the ring buffer from when the current value entered the threshold value width IB within the no-load current range until the judgment time Tc is reached is equal to or less than the threshold value width IB within the no-load current range, it is judged that the judgment of whether or not the current value is continuously within the no-load current range is satisfied. As a result, Step S6 of FIG. 4 is judged to be "YES." and in Step S7, the drive of the electric motor 7A is stopped. Further, in Step S7, the ring buffer values are cleared, and the process returns to the start. In this manner, in Step S6, satisfaction of the judgment regarding whether or not the current value is continuously within the no-load current range is judged based on the judgment result of the processing of FIG. 5, and when the judgment is satisfied, the drive of the electric motor 7A is stopped in Step S7, and the release is complete.

Figure 11:
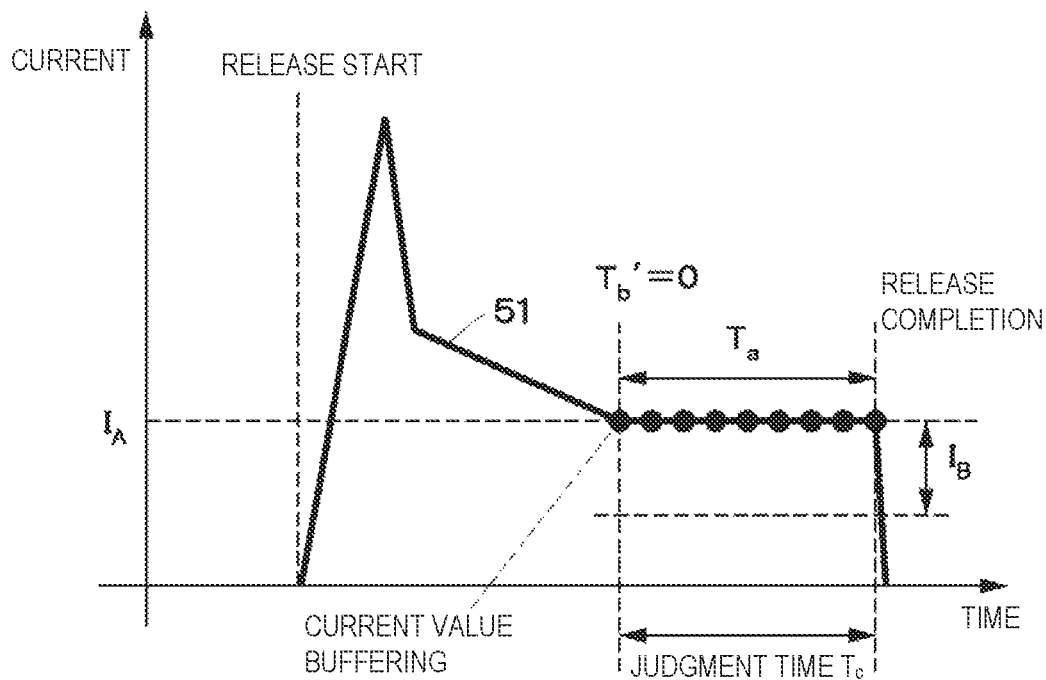
FIG. 11 is an explanatory graph for showing an example of change over time in the current value of the electric motor when a temperature is low and a rotational resistance is large (when the free running current value is high).
Figure 12:
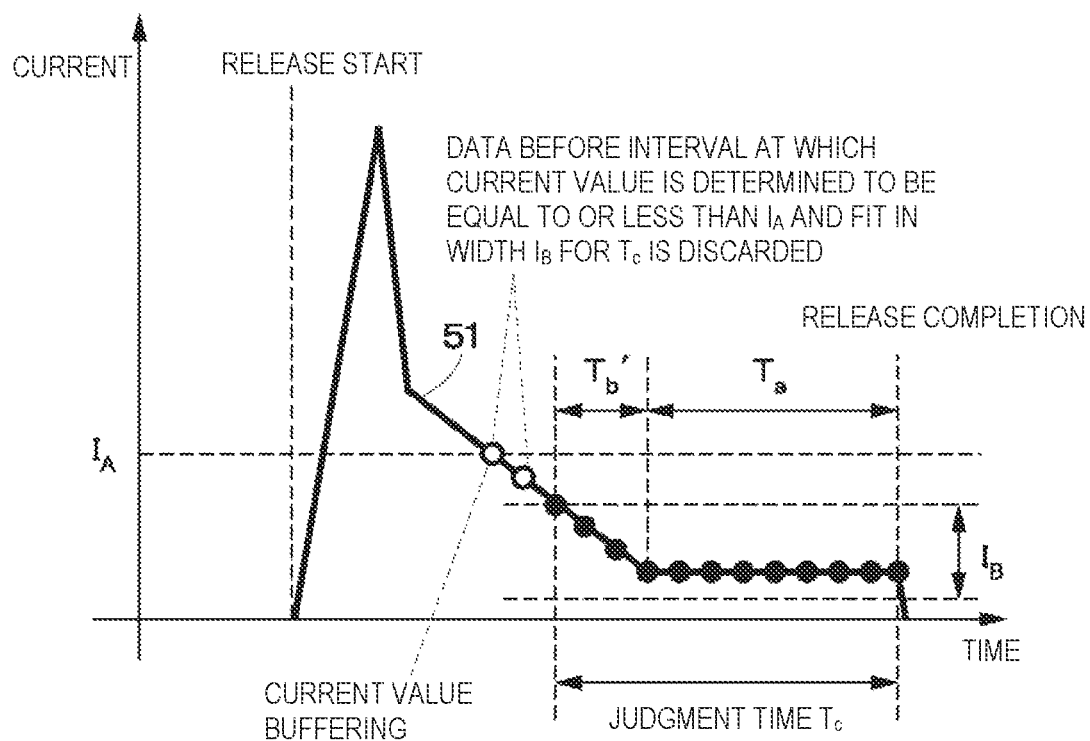
FIG. 12 is an explanatory graph for showing an example of change over time in the current value of the electric motor when the temperature is high and the rotational resistance is small (when the free running current value is low).

In FIG. 11, there is shown an example of change over time in the current value of the electric motor 7A when the temperature is low and the rotational resistance is large (when the free running current is high). That is, in FIG. 11, there is shown a characteristic curve when, for example, a viscous resistance of grease is large and the free running current is high, such as at a low temperature. In FIG. 12, there is shown an example of change over time in the current value of the electric motor 7A when the temperature is high and the rotational resistance is small (when the free running current is low). That is, in FIG. 12, there is shown a characteristic curve when a viscous resistance of grease is small and the free running current is low and/or motor efficiency and machine efficiency are good and the free running current is low, such as at a high temperature. As shown in FIG. 11 and FIG. 12, the interval of Tb' corresponding to the predetermined interval changes in accordance with the variation width of the current value depending on the temperature of the electric motor 7A. The predetermined interval (Tb') becomes longer or shorter depending on the temperature. Further, the threshold value width IB within the no-load current range corresponding to the current value range changes in accordance with the variation width of the current value depending on the temperature of the electric motor 7A. The current value range (width IB) moves in parallel on the higher or lower current side depending on the temperature. In such an embodiment, the clearance can be accurately controlled by reflecting the no-load current value ID obtained in the processing of FIG. 6 (differential judgment) and the correction time Tb' obtained in the processing of FIG. 7 (time judgment) in the judgment time Tc used in the release processing of FIG. 4 and FIG. 5. The white circles of FIG. 12 indicate that, due to the number of buffers of the ring buffer used for storage being reached, the data before the interval at which the current value is determined to be equal to or less than the threshold value IA and fit in the width IB for Tc has been discarded.

As described above, in the embodiment, when the parking brake is released, the electric motor 7A is stopped by using the drive time (judgment time Tc), which is the time for driving the electric motor 7A. In this case, the drive time (judgment time Tc) of the electric motor 7A is changed in accordance with the "current change amount in the predetermined interval (interval of Tb')" and the "current value (no-load current value ID) at which the current change amount converges to a predetermined value (threshold value Df) or less." In other words, the drive time (judgment time Tc) of the electric motor 7A is changed in accordance with the "current value acquired each predetermined cycle after the current value of the electric motor 7A has entered a predetermined current value range (threshold value width IB within the no-load current range)" and the "current value (no-load current value ID) at which the current value becomes substantially constant." Therefore, it is possible to judge the stop of the drive (completion of release) of the electric motor 7A more accurately than in the case of using the motor rotation amount. Consequently, the clearance can be accurately secured, and variation in the clearance can be suppressed. As a result, the responsiveness at the time of the next application can be stabilized in a high region.

In the embodiment, as shown in FIG. 11 and FIG. 12, the predetermined interval (interval of Tb') and the current value range (threshold value width IB within the no-load current range) change in accordance with the variation width of the current value depending on the temperature. Therefore, it is possible to accurately secure the clearance regardless of the ambient temperature. Further, in the embodiment, the no-load current value ID, which is the current value at which the current change amount of the electric motor 7A converges to a predetermined value (threshold value Df) or less, is detected from a current waveform obtained by the differential filter. In other words, the no-load current value ID, which is the current value at which the current value is substantially constant, is a current value at which the change in the derivative value of the current value obtained by the differential filter is equal to or less than a predetermined value (threshold value Df). Therefore, the no-load current value ID can be obtained accurately and stably by a differential filter having a large time constant. As a result, by changing the drive time (judgment time Tc) by using the current value after the filter, it is possible to stably judge the stop of the drive (completion of release) of the electric motor 7A.

In the embodiment, as an example, there has been described a case in which the rear-wheel disc brakes 6 are hydraulic disc brakes having an electric parking brake function and the front-wheel disc brakes 5 are hydraulic disc brakes not having an electric parking brake function. However, the present invention is not limited to this. For example, the rear-wheel disc brakes 6 may be hydraulic disc brakes not having an electric parking brake function and the front-wheel disc brakes 5 may be hydraulic disc brakes having an electric parking brake function. Further, the front-wheel disc brakes 5 and the rear-wheel disc brakes 6 may both be hydraulic disc brakes having an electric parking brake function. In short, the brakes of at least a pair of left and right wheels of the wheels of the vehicle can be configured as the electric parking brakes.

In the embodiment, as the electric brake mechanism, hydraulic disc brakes 6 having an electric parking brake have been described as an example. However, the brake mechanism is not limited to a disc brake type, and may be configured as a drum brake type brake mechanism. Further, various types of electric parking brake configurations can be adopted, for example, a drum-in disc brake having a drum-type electric parking brake in the disc brake, and a configuration in which the parking brake is held by pulling a cable by an electric motor.

As the electric brake device based on the embodiment described above, for example, the aspects described below can be considered.

According to a first aspect, there is provided an electric brake device including: a motor configured to drive an electric mechanism configured to hold a braking force by pressing a braking member against a braked member; and a control device configured to control a drive of the motor, wherein the control device is configured to, when releasing the hold on the braking force, energize the motor, and change a drive time of the motor in accordance with a current change amount in a predetermined interval after a predetermined time has elapsed since a current value of the motor starts to decrease after increasing and a current value at which the current change amount of the motor converges to a predetermined value or less.

According to this first aspect, when the hold on the braking force is released, the motor is stopped by using the drive time, which is the time for driving the motor. In this case, the drive time of the motor is changed in accordance with the "current change amount in the predetermined interval" and the "current value at which the current change amount converges to the predetermined value or less." Therefore, it is possible to judge the stop of the drive (completion of release) of the motor more accurately than in the case of using the motor rotation amount. As a result, the clearance can be accurately secured, and the responsiveness at the time of the next application can be stabilized in a high region.

According to a second aspect, in the first aspect, the predetermined interval changes in accordance with a variation width of the current value depending on a temperature of the motor. According to this second aspect, it is possible to accurately secure the clearance regardless of the ambient temperature.

According to a third aspect, in the first aspect or the second aspect, the current value at which the current change amount of the motor converges to the predetermined value or less is detected from a current waveform obtained by a differential filter. According to this third aspect, the current value at which the current change amount converges to the predetermined value or less can be obtained accurately and stably by the differential filter. As a result, by changing the drive time by using the current value after the filter, it is possible to stably judge the stop of the drive (completion of release) of the motor.

According to a fourth aspect, there is provided an electric brake device including: a motor configured to drive an electric mechanism configured to hold a braking force by pressing a braking member against a braked member; and a control device configured to control a drive of the motor, wherein the control device is configured to, when releasing the hold on the braking force, energize the motor, and change a drive time of the motor based on a current value acquired each predetermined cycle after the current value of the motor increases and then decreases to enter a predetermined current value range and a current value at which the current value becomes substantially constant.

According to this fourth aspect, when the hold on the braking force is released, the motor is stopped by using the drive time, which is the time for driving the motor. In this case, the drive time of the motor is changed in accordance with the "current value acquired each predetermined cycle after the current value of the motor has entered the predetermined current value range" and the "current value at which the current value becomes substantially constant." Therefore, it is possible to judge the stop of the drive (completion of release) of the motor more accurately than in the case of using the motor rotation amount. As a result, the clearance can be accurately secured, and the responsiveness at the time of the next application can be stabilized in a high region.

According to a fifth aspect, in the fourth aspect, the predetermined current value range changes in accordance with a variation width of the current value depending on a temperature of the motor. According to this fifth aspect, it is possible to accurately secure the clearance regardless of the ambient temperature.

According to a sixth aspect, in the fourth aspect or the fifth aspect, the current value at which the current value becomes substantially constant is a current value at which a change in a derivative value of the current value obtained by a differential filter becomes equal to or less than a predetermined value. According to this sixth aspect, the current value at which the current value becomes substantially constant can be obtained accurately and stably by the differential filter. As a result, by changing the drive time by using the current value after the filter, it is possible to stably judge the stop of the drive (completion of release) of the motor.

According to a seventh aspect, there is provided an electric brake control device for controlling a motor configured to drive an electric mechanism configured to hold a braking force by pressing a braking member against a braked member, the electric brake control device being configured to, when releasing the hold on the braking force, energize the motor, and change a drive time of the motor in accordance with a current change amount in a predetermined interval after a predetermined time has elapsed since a current value of the motor starts to decrease after increasing and a current value at which the current change amount of the motor converges to a predetermined value or less.

According to this seventh aspect, when the hold on the braking force is released, the motor is stopped by using the drive time, which is the time for driving the motor. In this case, the drive time of the motor is changed in accordance with the "current change amount in the predetermined interval" and the "current value at which the current change amount converges to the predetermined value or less." Therefore, it is possible to judge the stop of the drive (completion of release) of the motor more accurately than in the case of using the motor rotation amount. As a result, the clearance can be accurately secured, and the responsiveness at the time of the next application can be stabilized in a high region.

Note that, the present invention is not limited to the embodiment described above, and includes further various modification examples. For example, in the embodiment described above, the configurations are described in detail in order to clearly describe the present invention, but the present invention is not necessarily limited to an embodiment that includes all the configurations that have been described. Further, a part of the configuration of a given embodiment can be replaced by the configuration of another embodiment, and the configuration of another embodiment can also be added to the configuration of a given embodiment. Further, another configuration can be added to, deleted from, or replace apart of the configuration of each of the embodiments.

REFERENCE SIGNS LIST 4 disc rotor (braked member), 6 rear-wheel disc brake, 6C brake pad (braking member), 7A electric motor (motor, electric mechanism), 8 rotation-linear motion conversion mechanism (electric mechanism), 24 parking brake control device (control device, electric brake control device)

The invention claimed is:
1. An electric brake device, comprising:
a motor configured to drive an electric mechanism configured to hold a braking force by pressing a braking member against a braked member; and
a control device configured to control a drive of the motor,
wherein the control device is configured to, when releasing the hold on the braking force, stop the motor when a drive time (T3) elapses, the drive time (T3) being a sum of a time (T1) from when a current value of the motor enters a range of a constant current width (IB) until the current value of the motor becomes a no-load current value (ID) and a time (T2) required to secure a clearance between the braking member and the braked member, and
wherein the drive time (T3) is changed based on:
a current change amount from when the current value of the motor enters the range of the constant current width (IB) after a time has elapsed since the motor is energized, the current value of the motor starts to decrease after increasing and inrush current converges until the current value of the motor becomes the no-load current value (ID); and
a current value at which the current change amount of the motor converges to become equal to or less than a threshold value (Df) for judging that the current value is the no-load current value (ID).

2. The electric brake device according to claim 1, wherein the constant current width (IB) changes based on a variation width of the current value depending on a temperature of the motor.

3. The electric brake device according to claim 2, wherein the current value at which the current change amount of the motor converges to become equal to or less than the threshold value (Df) is detected from a current waveform obtained by a differential filter.

4. The electric brake device according to claim 1, wherein the current value at which the current change amount of the motor converges to become equal to or less than the threshold value (Df) is detected from a current waveform obtained by a differential filter.

5. An electric brake device, comprising:
a motor configured to drive an electric mechanism configured to hold a braking force by pressing a braking member against a braked member; and
a control device configured to control a drive of the motor,
wherein the control device is configured to, when releasing the hold on the braking force, stop the motor when a drive time (T3) elapses, the drive time (T3) being a sum of a time (T1) from when a current value of the motor enters a range of a constant current width (IB) until the current value of the motor becomes a no-load current value (ID) and a time (T2) required to secure a clearance between the braking member and the braked member, and
wherein the drive time (T3) is changed based on:
a current value acquired each control cycle after the motor is energized, and the current value of the motor increases and then decreases to enter the range of the constant current width (IB); and
a current value at which the current value becomes substantially constant.

6. The electric brake device according to claim 5, wherein the constant current width (IB) changes based on a variation width of the current value depending on a temperature of the motor.

7. The electric brake device according to claim 6, wherein the current value at which the current value becomes substantially constant is a current value at which a change in a derivative value of the current value obtained by a differential filter becomes equal to or less than a threshold value (Df) for judging that the current value is the no-load current value (ID).

8. The electric brake device according to claim 5, wherein the current value at which the current value becomes substantially constant is a current value at which a change in a derivative value of the current value obtained by a differential filter becomes equal to or less than a threshold value (Df) for judging that the current value is the no-load current value (ID).

9. An electric brake control device for controlling a motor configured to drive an electric mechanism configured to hold a braking force by pressing a braking member against a braked member,
the electric brake control device being configured to, when releasing the hold on the braking force, stop the motor when a drive time (T3) elapses, the drive time (T3) being a sum of a time (T1) from when a current value of the motor enters a range of a constant current width (IB) until the current value of the motor becomes a no-load current value (ID) and a time (T2) required to secure a clearance between the braking member and the braked member, and wherein the drive time (T3) is changed based on:

a current change amount from when the current value of the motor enters the range of the constant current width (IB) after a time has elapsed since the motor is energized, the current value of the motor starts to decrease after increasing and inrush current converges until the current value of the motor becomes the no-load current value (ID); and a current value at which the current change amount of the motor converges to become equal to or less than a threshold value (Df) for judging that the current value is the no-load current value (ID).

* * * * *